United States Patent [19]

Idlas

[11] Patent Number: 5,759,648
[45] Date of Patent: Jun. 2, 1998

[54] MULTILAYER PLASTIC FILM, USEFUL FOR PACKAGING A COOK-IN FOODSTUFF

[75] Inventor: Scott Allan Idlas, Downers Grove, Ill.

[73] Assignee: Viskase Corporation, Chicago, Ill.

[21] Appl. No.: 675,976

[22] Filed: Jul. 5, 1996

[51] Int. Cl.$^6$ .................... B32B 27/28; B32B 27/32
[52] U.S. Cl. .................... 428/34.9; 428/35.4; 428/36.7; 428/213; 428/214; 428/215; 428/332; 428/515; 428/516; 428/514; 428/520; 428/910; 264/173.15; 264/173.16; 264/290.2
[58] Field of Search .................... 428/514, 515, 428/516, 520, 213, 215, 214, 216, 332, 335, 336, 36.6, 36.7, 34.9, 35.4, 910; 264/290.2, 173.16, 173.15

[56] References Cited

U.S. PATENT DOCUMENTS

| | | | |
|---|---|---|---|
| 3,456,044 | 7/1969 | Pahlke | 264/95 |
| 3,741,253 | 6/1973 | Brax et al. | 138/137 |
| 4,064,296 | 12/1977 | Bornstein et al. | 428/35 |
| 4,407,897 | 10/1983 | Farrell et al. | 428/516 |
| 4,448,792 | 5/1984 | Schirmer | 426/113 |
| 4,456,960 | 6/1984 | Newsome | 428/35 |
| 4,469,742 | 9/1984 | Oberle et al. | 428/215 |
| 4,495,249 | 1/1985 | Ohya et al. | 428/516 |
| 4,511,610 | 4/1985 | Yazaki et al. | 428/35 |
| 4,557,780 | 12/1985 | Newsome et al. | 156/244.11 |
| 4,640,856 | 2/1987 | Ferguson et al. | 428/36 |
| 4,724,185 | 2/1988 | Shah | 428/339 |
| 4,726,984 | 2/1988 | Shah | 428/216 |
| 4,734,327 | 3/1988 | Vicik | 428/332 |
| 4,737,391 | 4/1988 | Lustig et al. | 428/35 |
| 4,758,463 | 7/1988 | Vicik et al. | 428/216 |
| 4,857,399 | 8/1989 | Vicik | 428/332 |
| 4,863,769 | 9/1989 | Lustig et al. | 428/34.9 |
| 4,888,223 | 12/1989 | Sugimoto et al. | 428/34.9 |
| 5,004,647 | 4/1991 | Shah | 428/349 |
| 5,219,929 | 6/1993 | Miyashita et al. | 525/57 |
| 5,283,128 | 2/1994 | Wilhoit | 428/516 |
| 5,298,326 | 3/1994 | Norpoth et al. | 428/349 |
| 5,382,470 | 1/1995 | Vicik | 428/334 |
| 5,397,613 | 3/1995 | Georgelos | 428/36.7 |

FOREIGN PATENT DOCUMENTS

| | | |
|---|---|---|
| 2085813 | 6/1994 | Canada . |
| 2119550 | 9/1994 | Canada . |
| 62815 | 10/1982 | European Pat. Off. . |
| 69495 | 1/1983 | European Pat. Off. . |
| 561428 | 9/1983 | European Pat. Off. . |
| 92897 | 11/1983 | European Pat. Off. . |
| 118060 | 9/1984 | European Pat. Off. . |
| 120503 | 10/1984 | European Pat. Off. . |
| 207719 | 1/1987 | European Pat. Off. . |
| 214945 | 3/1987 | European Pat. Off. . |
| 217252 | 4/1987 | European Pat. Off. . |
| 217596 | 4/1987 | European Pat. Off. . |
| 236099 | 9/1987 | European Pat. Off. . |
| 334293 | 9/1989 | European Pat. Off. . |
| 346944 | 12/1989 | European Pat. Off. . |
| 353981 | 2/1990 | European Pat. Off. . |
| 369808 | 5/1990 | European Pat. Off. . |
| 447988 | 9/1991 | European Pat. Off. . |
| 457598 | 11/1991 | European Pat. Off. . |
| 594918 | 5/1994 | European Pat. Off. . |
| 600425 | 6/1994 | European Pat. Off. . |
| 687558 | 12/1995 | European Pat. Off. . |
| 700777 | 3/1996 | European Pat. Off. . |
| 6154 | 1/1985 | Japan . |
| 2131739 | 6/1984 | United Kingdom . |
| 2134446 | 8/1984 | United Kingdom . |
| 14784 | 9/1992 | WIPO . |
| 8221 | 4/1993 | WIPO . |
| 7954 | 4/1994 | WIPO . |
| 23946 | 10/1994 | WIPO . |
| 333 | 1/1995 | WIPO . |

OTHER PUBLICATIONS

Plexar PX380, 2 page, data sheet (Apr. 1994).

*Primary Examiner*—Paul J. Thibodeau
*Assistant Examiner*—D. Lawrence Tarazano
*Attorney, Agent, or Firm*—Cedric M. Richeson

[57] ABSTRACT

A multilayer, preferably biaxially oriented, film suitable for processing and/or packaging cook-in foods such as ham, roast beef and poultry having an excellent combination of oxygen barrier, heat seal and optical properties comprising at least five essential sequential layers with a first layer of a copolymer of propene and at least one $C_2$–$C_8$ α-olefin having a propene content of at least 60 wt. % and preferably having a melting point <140 °C.; a second layer of (1) a first copolymer of ethylene and at least one $C_4$–$C_8$ α-olefin having a density of from 0.900 to 0.915 g/cm$^3$ and a melt index of less than 1.0 dg/min., (2) a second copolymer of ethylene with from 4 to 18%, preferably 4 to 12%, of a vinyl ester or alkyl acrylate, (3) an anhydride-modified third copolymer of ethylene with at least one α-olefin, a vinyl ester or an alkyl acrylate, and (4) optionally a fourth copolymer of ethylene and at least one $C_3$–$C_8$ α-olefin having a density less than 0.900 g/cm$^3$ and a melting point less of less than 85° C.; a third EVOH layer; a fourth layer like the second layer; and a fifth layer of a first copolymer of ethylene with at least one $C_4$–$C_8$ α-olefin having a density of from 0.900 to 0.915 g/cm$^3$ and a melt index of less than 1.0 dg/min., and a second copolymer of ethylene with from 4 to 18%, preferably 4 to 12%, of a vinyl ester or alkyl acrylate, and optionally a third copolymer of ethylene and at least one $C_3$–$C_8$ α-olefin having a density less than 0.900 g/cm$^3$ and a melting point less of less than 85° C.

47 Claims, No Drawings

MULTILAYER PLASTIC FILM, USEFUL FOR PACKAGING A COOK-IN FOODSTUFF

BACKGROUND OF THE INVENTION

The present invention relates to improvements in the art of packaging foodstuffs, especially cook-in foods such as for example ham, beef, and turkey breasts.

In discussing plastic film packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

PP -Polypropylene homopolymer

PE -Polyethylene (an ethylene homopolymer and/or copolymer of a major portion of ethylene with one or more α-olefins)

EVA -Copolymer of ethylene with vinyl acetate

PVDC -Polyvinylidene chloride (also includes copolymers of vinylidene chloride, especially with vinyl chloride)

EVOH -A saponified or hydrolyzed copolymer of ethylene and vinyl acetate

EAA -Copolymer of ethylene with acrylic acid

Various published patent documents disclose different types of packaging films for cook-in and other processing or packaging applications.

U.S. Pat. No. 4,724,185 (Shah) discloses a five layer coextruded oriented film having a core layer of an EVOH-nylon blend attached to outer layers of a blend of linear low density polyethylene, linear medium density polyethylene, and EVA using intermediate layers of an acid anhydride-modified adhesive resin. The film is irradiated.

U.S. Pat. No. 4,726,984 (Shah) discloses a five layer coextruded oriented shrink film having a core layer of EVOH attached by adhesive layers to opposing outer layers of a blend of ethylene propylene copolymer(2–5 wt. % $C_2$) and polypropylene.

U.S. Pat. No. 4,469,742 (Oberle) discloses a cook-in six layer heat shrinkable film having examples which includes a structure of $C_3C_2$ random copolymer/EVA/anhydride graft adhesive/EVOH/anhydride graft adhesive/EVA. The EVA may be replaced with ethylene homopolymer or copolymer such as LLDPE. The film may be irradiatively cross-linked and extruded. A comparative example of a five layer film is also presented which has a structure of $C_3C_2$ random copolymer/EVA/anhydride graft adhesive/EVOH/EVA.

U.S. Pat. No. 4,857,399 (Vicik) discloses a four layer shrink film comprising an ethylene-propylene random copolymer as a meat contact first layer, a blend of EVA and an anhydride-modified adhesive resin as an intermediate second layer, an EVOH-nylon blend barrier core layer, and a blend of anhydride-modified adhesive and EVA as a fourth layer.

U.S. Pat. No. 5,382,470 (Vicik) discloses a biaxially stretched oriented heat shrinkable film for food packaging having an EVOH-nylon 6/66 copolymer core layer connected by intermediate adhesive layers to opposing outer layers. The adhesive layers are disclosed to be specific blends of resins including VLDPE, EVA, and anhydride-modified PE or EVA adhesive resins. The outer layers may comprise a blend of VLDPE, EVA and plastomeric ethylene α-olefin copolymer.

U.S. Pat. No. 5,397,613 (Georgelos) discloses a heat shrinkable film of at least 50% shrink having a $C_2$α-olefin layer($\rho$=0.88–0.905;m.p. <100° C.;$\overline{M}_w\overline{M}_n$<3) which may have EVA and another $C_2$α-olefin blended therein. This film may be on both sides of a barrier layer which may be EVOH.

U.S. Pat. No. 4,888,223 (Sugimoto et al) discloses a corona treated, heat shrinkable, multilayer, tubular film having a possible structure of polyolefin/modified polyolefin/gas barrier/modified polyolefin/polyolefin where the inner meat contact layer is corona treated at a level of at least 35 dynes/cm. The inner layer may be a polypropylene copolymer. The modified polyolefin may be a maleic anhydride grafted LLDPE. The gas barrier may be EVOH.

EP 561,428 (Fant et al), claims a multilayer film comprising a core layer of an ethylene vinyl alcohol copolymer; two outer polymeric layers; two interior layers of an acid- or acid anhydride modified polyolefin adhesive polymeric material to bond the outer layers to the core layer. A dependent claim specifies that both outer layers may comprise $C_3C_2$ copolymer.

EP 457 598 (Shah et al) discloses a polyamide based multilayer film for packaging cheese. This polyamide film is disclosed as having "an oxygen transmission rate of no more than 500 cc/m², 24 hrs., atm". Example 5 purportedly discloses a 1 mil (25.4 micron) thick biaxially oriented film having a core layer comprising a blend of about 70% EVOH and about 30% of a polyamide in combination with polypropylene or propylene copolymer based outer layers and this film has a reported shrinkage at 220° F. (104° C.) of 24% in two directions.

PCT 94/07954 (Kaeding), assigned to DuPont, has broad claims drawn to a shrink film comprising a blend of a first polyolefin ($\rho$<.0.92 g/cm³; $\overline{M}_w/\overline{M}_n$ of 1–4; m.p<115° C.; single narrow m.p.) with a second polyolefin having a m.p. that is 10° C. greater than the m.p. of the first polyolefin and an orientation temperature at least 2° C. less than its m.p.. Also, disclosed are multilayer structures having a core layer of the above with a $C_3C_2$ copolymer or polypropylene outer layer.

Various multilayer thermoplastic films have been commercialized for packaging meats, cheeses and cook-in foodstuffs. Three to six layer films are common. Typical structures include: PP/Adhesive/Nylon, EVA/PVDC/EVA:PE, PE:EVA/PVDC/PE:EVA, Ionomer/EVA/Adhesive/EVOH/Adhesive/EVA, PE:EVA/PE:Adhesive:EVA/EVOH/PE:Adhesive:EVA/PE:EVA, Nylon/EVA/Adhesive/EVOH/Adhesive/EVA, $C_3C_2$ copolymer/EVA/Adhesive/EVOH/Adhesive/EVA, and variations thereof where polyethylene copolymers are blended into one or more of the EVA layers. Some packaging films are heat shrinkable at 90° C. and others are not. Some are irradiatively crosslinked and/or corona treated or not. Some of the nonshrinking films have an oxygen barrier comprising one or more layers of nylon or EVOH or a blend of EVOH with nylon. Such known nonshrinking films include structures of the type EVA:PE/Nylon, EVA:PE/Nylon/EVOH/Nylon/EVA:PE, EVA:PE/PVDC/Nylon, EVA:PE/EVOH/Nylon, and EVA:PE/Nylon/EVA. The nonshrinking EVOH containing films generally have a relatively thick EVOH containing layer, generally greater than 0.5 mil (12.7 microns). Thin EVOH barrier layer, multilayer heat shrinkable, oriented films have been taught in U.S. Pat. No. 5,382,470 and U.S. application Ser. No. 08/191,886; filed Feb. 3, 1994, both of which are hereby incorporated by reference in their entireties.

Of the foregoing nonshrinking films, those containing EVOH have a typical oxygen permeability of less than 10 cm$^3$ per m$^2$ at 1 atm, 0% relative humidity and 23° C. and are considered high barrier films. The terms "barrier" or "barrier layer" as used herein mean a layer of a multilayer film which acts as a physical barrier to gaseous oxygen molecules. Physically, a barrier layer material will reduce the oxygen permeability of a film (used to form the bag) to less than 70 cm$^3$ per square meter in 24 hours at one atmosphere, 73° F. (23° C.) and 0% relative humidity. These values should be measured in accordance with ASTM standard D-1434.

Also known are films suitable for packaging foodstuffs that are heat shrinkable at 90° C. which contain nylon or a blend of EVOH and nylon. Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films). Such known films include structures of the following types:Ionomer/PE/Nylon, Ionomer/EVA/Nylon, EAA/Nylon:EVOH/Ionomer, and PE/EVOH:Nylon/PE. Some of these EVOH containing heat shrinkable films have an oxygen permeability in the high barrier range.

Also, recycling of PVDC polymers is difficult, particularly where the waste polymer is mixed with other polymers having different melting points. Attempts to remelt film containing PVDC frequently results in degradation of the PVDC component. For this reason EVOH has been employed as an alternative barrier layer. However, use of EVOH in multilayer structures frequently leads to undesirably poor optical properties, especially high haze, and to film structures which are difficult to process and orient. EVOH is a very stiff material and layers containing EVOH often delaminate from adjoining layers or crack during processing and orientation thereby exhibiting lines, streaks, and other undesirable optical properties.

Commercially available bags are made by transversely sealing a tubular stock of either monolayer or multilayer film and cutting off the tube portion containing the sealed end, or by making two spaced apart transverse seals on a tubular stock and cutting open the side of the tube, or by superimposing flat sheets of film and sealing on three sides, or by end folding flat sheets and sealing two sides.

Generally heat sealing of thermoplastic film is accomplished by applying sufficient heat and pressure to adjacent film layer surfaces for a sufficient time to cause a fusion bond between the layers.

A common type of seal used in manufacturing bags is known to those skilled in the art as a hot bar seal. In making a hot bar seal, adjacent thermoplastic layers are held together by opposing bars of which at least one is heated to cause the adjacent thermoplastic layers to fusion bond by application of heat and pressure across the area to be sealed. For example, bags may be manufactured from a tube stock by making one hot bar seal transverse to the tube. This seal may also be referred to as a bottom seal. Once the bottom seal is applied, the tube stock may be transversely cut to form the mouth of the bag.

Once a food product such as meat or poultry is inserted into the bag, the package is typically evacuated and the bag mouth sealed. At one time, the standard method for sealing a bag was to fasten a clip around the mouth of the bag. Although this method is still used, more recently, heat sealing techniques have been employed to seal bags. For example, a bag mouth may be hot bar sealed or it may be sealed by another common type of heat seal known as an impulse seal. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are cooled (e.g. by circulating coolant) while continuing to hold the bag inner surfaces together to achieve adequate sealing strength.

One problem which occurs during impulse heat sealing of known films is that the film in the seal area often becomes extruded during sealing. This results in thinning of the film in the seal area and therefore reduces the strength of the film at the seal or in extreme situations, allows the thinned film to be too easily severed or pulled apart. Those skilled in the art refer to severely extruded seals as "burn through" seals. Thus, a "burn through" seal does not have adequate strength or integrity to seal in or protect the packaged product. One attempt to solve this "burn through" problem is to irradiate the film prior to manufacture of the bag.

Irradiation of a multilayer film causes the various irradiated layers in the film to crosslink. Under controlled conditions, crosslinking by irradiation raises and may also broaden the temperature range for heat sealing, and may also enhance the puncture resistance of the film.

Disadvantageously, if the heat sealing layer of the thermoplastic film is crosslinked too heavily, the highly crosslinked layer is more difficult to melt or fusion bond which makes it difficult to achieve strong seals, particularly by impulse sealing the bag mouths after filling with meat or poultry. All of the bag seals (including those made by both the bag manufacturers and the food processor and by whatever means including either or both hot bar seals and impulse seals must maintain their integrity to preserve and protect the enclosed food product.

There must be a strong continuous seal to prevent unwanted egress and ingress of gaseous, liquid or solid materials between the bag exterior and interior. This is particularly necessary when the food-containing package is made of heat shrinkable film and is to be cooked in steam or hot water and/or immersed in hot water to shrink the film against the packaged food since such shrinkage increases the stress on these seals. Thus, there is a continuing need for multilayer films which can be made into bags having strong seals especially when formed by hot bar sealing or impulse sealing. Such films should provide strong seals able to withstand a range of temperatures and also be able to produce such seals over a wide sealing temperature range without burn through.

Variations in sealing temperatures, times and pressure are known to exist not only from one brand and/or type of sealers to another but also between different sealing machines sold by the same manufacturer under the same brand identification. Such variations, which may be due to factors such as variation in the manufacturer's product or varying equipment settings or installation, increase the desirability for films which may be heat sealed to produce strong integral seals over a wide range of temperatures and therefore be usefully sealed on different sealing machines.

Another problem encountered during heat sealing is that of inadvertent folding. Normally, a heat seal is made by applying heat and pressure across two sheets or portions of film e.g. the two opposing sides of a flattened tube, however, occasionally the area to be sealed will be inadvertently folded to produce a section of film having four or six sheets or film portions which are pressed between the opposing sealer bars. In such situations it is desirable to be able to seal the film without burn through. A wider impulse heat sealing temperature range is indicative of a greater latitude in sealing through folds than a narrower range.

SUMMARY OF THE INVENTION

It is an object of the invention to provide a multilayer film having a low oxygen permeability.

It is still another object of the invention to provide a film having low permeability to water vapor.

It is another object of the invention to provide a multilayer film having controllable meat adhesion.

It is another object of the invention to provide a multilayer film containing EVOH which is delamination resistant.

It is another object of the invention to provide a film of sufficient integrity to withstand the cook-in process with intact seals and film layers.

It is another object of the invention to provide a heat sealable film capable of forming high strength fusion bonds.

It is another object of the invention to provide a multilayer film containing EVOH which has high shrinkage values at 90° C. or less.

It is a further object of the invention to provide an irradiatively crosslinked, multilayer film having an EVOH core layer having a broad impulse heat sealing voltage range.

It is yet another object of the invention to provide an EVOH containing multilayer film having good optical properties.

It is a further object of the invention to provide a chlorine-free packaging film.

It is an object of the invention to provide a film for packaging foods such as hams which are cooked and shipped in the same film.

It is another object of the invention to provide a packaged cook-in foodstuff using a multilayer film having a oxygen barrier layer.

The above and other objects, benefits and advantages of the invention will be apparent from the disclosure below which is exemplary and nonlimiting. It is not necessary that each and every object listed above be found in all embodiments of the invention. It is sufficient that the invention may be usefully employed.

According to the present invention an article such as a foodstuff, especially ham, is packaged in a multilayer, thermoplastic, flexible film of at least five layers arranged in sequence (first, second, third, fourth, fifth) and in contact with one another. The first layer comprises at least 50% by weight of a copolymer of propene and at least one α-olefin selected from the group consisting of ethylene, butene-1, methylpentene-1, hexene-1, octene-1 and mixtures thereof having a propene content of at least 60 wt. %. The second layer is comprised of a blend of (i) at least 10% of a first copolymer of ethylene and at least one $C_4$–$C_8$ α-olefin having a copolymer density of from 0.900 to 0.915 g/cm$^3$ and a melt index of less than 1.0 dg/min., and (ii) at least 10% of a second copolymer of ethylene with from 4 to 18% of a vinyl ester or alkyl acrylate, and (iii) at least 10% of an anhydride-modified third copolymer of ethylene with at least one α-olefin, a vinyl ester or an alkyl acrylate, and optionally from 0 to 30% of a fourth copolymer of ethylene and at least one $C_3$–$C_8$ α-olefin having a density less than 0.900 g/cm$^3$ and a melting point less of less than 85° C. The second layer may also optionally contain a propene copolymer as described above for the first layer. The third layer is a core layer which comprises at least 80 weight percent, preferably at least 90 weight percent, ethylene vinyl alcohol copolymer having an ethylene content of about 38 mole percent or higher. In a preferred embodiment this third layer may have a thickness of about 0.05 to 0.3 mil (1.7–7.62 microns).and preferably 0.14 to 0.2 mil (4.1–5.1 microns). The fourth layer may be the same or different from the second layer but is comprised of a blend of resins as described above for the second layer. The fifth layer comprises a blend of (i) at least 30% of a first copolymer of ethylene with at least one $C_4$–$C_8$ α-olefin having a copolymer density of from 0.900 to 0.915 g/cm$^3$ and a melt index of less than 1.0 dg/min.; (ii) at least 10% of a second copolymer of ethylene with from 4 to 18% of a vinyl ester or alkyl acrylate; and (iii) optionally from 0 to 30% of a third copolymer of ethylene and at least one $C_3$–$C_8$ α-olefin having a density less than 0.900 g/cm$^3$ and a melting point less of less than 85° C. Preferably, the inventive film will be heat sealable having at least one layer which is crosslinked, preferably by irradiation. In a highly useful embodiment of the invention, the film will be heat shrinkable at temperatures such as 90° C. or lower, and may have shrinkage values in one or both of the MD and TD directions of at least about 20%, and advantageously e.g. for packaging cook-in foods such as ham or poultry breasts may be at least 30%.

In one embodiment of the invention, a process for making the above-described film is claimed. The film is useful to process and/or package articles, especially foodstuffs such as ham, beef, poultry, or processed meat which may be cooked in the film.

DETAILED DESCRIPTION OF THE INVENTION

The inventive film, bag, process and package of the present invention may be used as a heat sealable, oxygen and moisture barrier film for holding a foodstuff during cooking and/or for packaging for sale of such a foodstuff after a pasteurization or cooking period.

The present invention is particularly well adapted to processing and packaging pasteurizable foods, and has particular utility in packaging cook-in hams. "Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally even left on during retail sale.

Some of the benefits of the inventive film include: relatively low permeability to oxygen and water vapor; high delamination resistance and an unexpectedly good combination of delamination resistance especially at elevated temperatures simulating cook-in conditions and orientability resulting in good low temperature heat shrinkability; resistance to degradation by food acids, salts and fat; high shrinkage values at low temperatures (90° C. or lower); residual shrink force which forms and maintains a compact product; controllable meat adhesion; good to excellent heat sealability especially over a broad voltage range on commercial sealers; low levels of extractables with compliance with governmental regulations for food contact; low haze; high gloss; does not impart off tastes or odors to packaged food; good tensile strength; a surface which is printable;

high heat seal strength and a long lasting seal especially at cook-in temperatures; and good machinability.

Advantageously, a preferred embodiment of the invention has low $O_2$ and low water vapor permeabilities in combination with high meat adhesion which prevents undesirable cook-out of liquid during processing, good heat sealability and high low temperature (90° C. or less) shrinkage values. In an especially preferred embodiment, the inventive film has at least 20% (more preferably about 30% or higher) shrinkage values in at least one direction at 90° C. or less, and preferably at least 25% in both directions. Also, preferred films are heat sealable over a broad voltage range, and preferably heat shrinkable at low temperatures in combination with such broad range heat sealability.

Also, the oxygen barrier properties of the inventive film reduces or eliminates losses from spoilage e.g. by rancidity due to oxidation. The inventive films and bags are particularly useful for packaging cook-in foodstuffs, but may also be employed as packaging for a wide variety of food and non-food articles.

The present invention may be employed as bags in the various typical sizes. By "flatwidth" is meant the transverse width of a flattened tubular film. The flatwidth is also equal to ½ of the circumference of the tubular film.

The invention in all of its embodiments comprises or utilizes a multilayer thermoplastic polymeric flexible film of 10 mils (254 microns) or less having a propene-based copolymer layer for food contact which provides heat sealability, an EVOH gas barrier layer, an outer abuse resistant layer, and adhesive layers which utilize a combination of high molecular weight, low molecular weight, highly branched and substantially linear polymers to produce a surprisingly orientable film having high delamination resistance even under cook-in conditions. The EVOH containing layer controls the gas permeability of the film. The propene-based copolymer containing layer controls the adherability of the film to an enclosed food, which for meat is termed "meat adhesion", and also controls heat sealability and seal strength, particularly at elevated temperatures and over time. The adhesive layers control delamination resistance to the EVOH core layer, and beneficially enhance orientability.

Such films will preferably have a thickness of about 2–3 mils (50.8–76.2 microns), although suitable films for packaging foodstuffs as thick as 4 mils (101.6 microns) or as thin as 1 mil (25.4 microns) may be made. Typically, films will be between about 1.5–3 mil (38.1–76.2 microns). Especially preferred for use as films for packaging cook-in meats are films wherein the multilayer film has a thickness of between about 2 to 3 mils (50.8–76.2 microns). Such films have good abuse resistance and machinability. Films thinner than 2 mils are less abuse resistant and more difficult to handle in packaging processes. Advantageously, preferred films are heat shrinkable. Preferred films may also provide a beneficial combination of one or more or all of the properties including low haze, high gloss, high shrinkage values at 90° C. or less, good machinability, good mechanical strength and good barrier properties including high barriers to oxygen and water permeability.

Suitable films of the present invention may have low haze and high gloss e.g. less than 20% haze and a gloss greater than 50 Hunter Units(H.U.) at 45°. Advantageously, some preferred embodiments of the present invention may have haze values of less than 10–12% and preferably less than 6%, and very high gloss values e.g. greater than 65 Hunter Units and preferably greater than 75 H.U..

The inventive article is preferably a heat shrinkable multilayer film which must have at least five layers. These five essential layers are termed the first layer, the second layer, the third layer, the fourth layer, and the fifth layer. The first layer and fifth layer are disposed on opposing sides of the third layer and are preferably attached thereto by the second and fourth adhesive layers, respectively. These five layers are essential to the film of this invention. When the film is in tube or bag form these layers comprise the wall of the tube or bag. This wall in cross-section has the first layer comprising an outer layer disposed closest to the tube's (or bag's) interior surface with the fifth layer being an opposing outer layer typically disposed closest to the tube's (or bag's) exterior surface.

It is contemplated according to the present invention that tubular films having more than five layers may be constructed and that such additional layers may be disposed as additional intermediate layers lying between the third layer (also called the core layer) and either or both of the first and fifth layers, or these additional layers may comprise one or more surface layers and comprise either or both the interior or exterior surface of the tube. Preferably, the first layer will comprise the interior surface layer of the tube where in use it will contact a foodstuff encased by the tube.

Beneficially, this first layer will be heat sealable to facilitate formation of bags and hermetically sealed packages. Advantageously, the first layer as the interior surface layer will, when used to package foodstuffs, be suitable for contact with foodstuffs containing protein, water and fat without evolving or imparting harmful materials; off tastes or odors to the foodstuff. Beneficially, the first layer may be the interior surface layer and may consist essentially of a propene α-olefin copolymer. If desired, an ionomeric resin may be used either alone or blended in one or more of the layers but such use is unnecessary to produce a film suitable for packaging cook-in foodstuffs. Advantageously, the heat sealing layer and indeed the entire film may be free of ionomer polymer yet provide entirely satisfactory performance without the added expense of using costly ionomer resin.

Also, it is preferred that the fifth layer will comprise the exterior surface of the tube or bag. As the exterior surface layer of the tube or bag, the fifth layer should be resistant to abrasions, abuse and stresses caused by handling and it should further be easy to machine (i.e. be easy to feed through and be manipulated by machines e.g. for conveying, packaging, printing or as part of the film or bag manufacturing process). It should also facilitate stretch orientation where a high shrinkage film is desired, particularly at low temperatures such as 90° C. and lower.

Advantageously, the first layer will be predominantly comprised of propylene copolymers having a propylene (propene) content of 60 wt. % or more. Such layer is preferably an interior surface layer of the tube or bag.

The surface layers function to protect the core layer from abuse and may also protect it from contact with moisture which may impact or alter the gas barrier properties of the core layer EVOH and/or nylon.

Beneficially, in the present invention there are intermediate adhesive layers on either side of the EVOH core layer(third layer). The second layer of this film is generally an unusually thick adhesive layer which in addition to providing delamination resistance between the adjacent EVOH layer and the opposing layer, also contributes to ease of orientation and facilitates formation of a biaxially stretched film having high shrinkage values particularly at low temperatures (90° C. or lower) in combination with optical properties which are superior to many prior art films. Use of an adhesive layer directly adhered to either side of the core layer produces a film which is extremely resistant to delamination and which may be oriented to produce film having high shrinkage of 30% or higher at 90° C. or less.

In a preferred embodiment, the EVOH core layer directly adheres to the second and fourth layers which function as adhesive layers and in turn are optionally directly adhered respectively to either (or preferably both) the interior(first) and exterior(fifth) layers. In a most preferred embodiment the film article consists essentially of five polymeric layers viz the interior(first) layer, the adhesive(second) layer, the core(third) layer; the adhesive(fourth) layer and the exterior (fifth) layer. This preferred embodiment provides a desirable combination of properties such as low moisture permeability, low $O_2$ permeability, controllable meat adhesion, high gloss, good mechanical strength, chlorine-free construction, and desirable shrink forces in a low temperature heat shrinkable, multilayer packaging film which is delamination resistant, heat sealable and which can be biaxially oriented. The core layer may optionally have processing aids or plasticizers. Nylon may optionally be incorporated in amounts up to 20 wt. %.

Typical layer thicknesses for the essential layers of the inventive heat shrinkable film may be about 5–40% first (typically interior surface) layer, 25–70% second (adhesive) layer, 3–13% third (core) layer, 1–35% fourth (adhesive) layer and 10–50% fifth (exterior) layer, although films with differing layer ratio thicknesses are possible. The first layer is typically an outer surface layer of the film and in a tubular construction is the interior surface layer of the tube. The function of the first layer is to provide a layer which has controllable meat adhesion and a surface which is heat sealable to itself (or to the second outer layer if a lap seal is desired) on commercially available equipment and (for food packaging) to provide a hygienic surface for contact with the foodstuff. In the present invention, to fulfill these functions the thickness of the first layer need not be great, but for an advantageous combination of ease of processing and seal performance this layer will preferably be from 0.1–1.2 mils thick. It is important that this heat sealable layer be continuous, e.g. over the interior surface of the tube, and that it be extruded at a sufficient thickness to allow heat sealing (if desired).

Preferably, the first layer is an outer heat sealing layer which allows the film to be formed into bags. By the term "heat sealing layer" is meant a layer which is heat sealable to itself, i.e., capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in a sealed bag form. For use in cook-in applications the heat seals should withstand elevated temperatures up to about 160°–180° F.(71°–82° C.) or higher for extended periods of time e.g. up to 4 to 12 hours in environments which may range from heated humidified air or steam to submersion in heated water. Finally, the bond interface between contiguous inner layers must have sufficient physical strength to withstand the tension resulting from stretching or shrinking due to the presence of a food body sealed within the tube and optionally subjected to pasteurization or cook-in temperatures and conditions.

Unless otherwise indicated in the present application, percentages of materials used in individual layers are based upon the weight of the indicated layer. The percentage of comonomer content of a particular polymer is based upon the weight of the indicated polymer.

The first layer especially as the interior surface layer of a tube according to the present invention also provides good machinability and facilitates passage of the film over equipment (e.g. for inserting foodstuffs). This layer may be coated with an anti-block powder. Also, conventional antiblock additives, polymeric plasticizers, or slip agents may be added to the first outer layer of the film or it may be free from such added ingredients. When this layer is corona treated, optionally and preferably no slip agent will be used, but it will contain or be coated with an anti-block powder or agent such as silica or starch. In one embodiment of the invention the first outer layer consists essentially of a propene copolymer, or blends thereof.

Suitable propene copolymer resins for use in the first layer have a propene content of at least 60 weight percent, optionally at least 80 wt. %. Optionally and preferably these copolymers will have a content of at least 90 wt. % propene. Copolymerized with propene will be at least one α-olefin selected from the group consisting of ethylene, butene-1, hexene-1, methylpentene-1, octene-1 and mixtures thereof in an amount up to 40 wt. %. Preferred are bipolymers of propene and ethene ($C_3C_2$ copolymers) as well as $C_3C_4$ bipolymers and $C_3C_2C_4$ terpolymers. Most preferred are $C_3 C_2$ copolymers especially bipolymers. A preferred $C_3C_2$ copolymer may have a propene content of at least 90% and optionally at least 95 wt. %. Preferred propene copolymers have a melting point between about 126° C. to 145° C., more preferably between about 129° C. to 136° C. Preferred are random copolymers of propylene. A preferred copolymer is commercially available from Solvay & Cie as a bioriented film grade resin under the trademark Eltex P KS 409. This resin is reportedly a random copolymer of propylene and ethylene having a melting point of less than 136° C., a density (p) of about 0.895 g/cm$^3$, a Vicat softening point of about 120° C. (ASTM 1525 (1 Kg)) and a melt index at 230° C. and 2.16 Kg of about 5 dg/min.

The first layer of the inventive film comprises a propene copolymer and has controllable meat adhesion. The meat adhering attribute of the film may be controlled by the absence, presence, and/or extent of surface energy treatment e.g., by corona discharge.

Films of the present invention which had not had their interior surface layer (first layer) corona treated will have a typical surface energy of at least 29 dynes per cm and typically less than 33. Corona treatment of the first layer can raise the surface energy to levels of at least 33 dynes/cm, preferably at least 34 dynes/cm. Most preferably levels of from about 35 to 38 dynes/cm will be usefully employed to produce films of the invention having high meat adhesion. Films that have high meat adhesion lessen cook-out of meat juices which if not prevented may lead to loss of product weight. Also, cook-out can produce an undesirable package appearance for applications where the processing/packaging film is intended to be left on the product for post-processing sale and use. Inventive films with low meat adhesion find utility in cook and strip applications where the film is typically removed from the encased foodstuff directly after cooking or pasteurization. The product after removal of the film is further processed or repackaged. Low meat adhesion films of the invention typically have a surface energy of less than 33 dynes/cm..

The core layer functions as a controlled gas barrier, and provides the necessary $O_2$ barrier for preservation of the article to be packaged. It should also provide good optical properties when stretch oriented, including low haze and a stretching behavior compatible with the layers around it. It is desirable that the thickness of the core layer be less than about 0.45 mil (10.16 microns) and greater than about 0.05 mil (1.27 microns) to provide the desired combination of the performance properties sought e.g. with respect to oxygen permeability, shrinkage values especially at low temperatures, ease of orientation, delamination resistance, and optical properties. Suitable thicknesses are less than 15% e.g. from 3 to 13% of the total film thickness. Preferably, the thickness of the core layer will also be less than about 10% of the total thickness of the multilayer film.

The core layer comprises EVOH which will control the oxygen permeability of the film. For perishable food packaging, the oxygen ($O_2$) permeability desirably should be minimized. Typical films will have an $O_2$ permeability of less than about 20 $cm^3/m^2$ for a 24 hour period at 1 atmosphere, 0% relative humidity and 23° C., and preferably less than 15 $cm^3/m^2$, more preferably less than 10 $cm^3/m^2$.

EVOH is prepared by the hydrolysis (or saponification) of an ethylene-vinyl acetate copolymer, and it is well known that to be an effective oxygen barrier, the hydrolysis-saponification must be nearly complete, i.e. to the extent of at least 97% (use of which is likewise preferred for the present invention). EVOH is commercially available in resin form with various percentages of ethylene and there is a direct relationship between ethylene content and melting point.

In the practice of this invention, the EVOH component of the core layer has a melting point of about 175° C. or lower. This is characteristic of commercially available EVOH materials having an ethylene content of about 38 mole % or higher. Suitable EVOHs having an ethylene content of 38 mole % have a melting point of about 175° C. With increasing ethylene content the melting point is lowered. A melting point of about 158° C. corresponds to an ethylene content of 48 mole %. Preferred EVOH materials will have an ethylene content of 44 mole %. EVOH copolymers having higher ethylene contents may be employed and it is expected that processability and orientation would be facilitated, however gas permeabilities, particularly with respect to oxygen may become undesirably high for certain packaging applications which are sensitive to product degradation in the presence of oxygen.

The amount of EVOH in the core layer may be adjusted by blending in nylon to vary orientation parameters or the gas permeability e.g. $O_2$ of the films of the invention. The thickness of the core layer may also be varied from about 0.05 to about 0.30 mils (1.3–7.62 microns). Also, while it is preferred that the core layer consist essentially of EVOH, the present invention recognizes the possibility not only that up to 20% by weight nylon may be present, but also other additives including polymers may be blended into the core layer to purposefully affect core layer properties such as gas permeability or moisture resistance in minor amounts.

When blending the EVOH of the oxygen barrier layer with nylon, nylon 6/66 is the preferred polyamide in the blend. Nylon 6/66 is a copolymer of nylon 6 and nylon 66. Nylon 6 is polyepsilon caprolactam. Nylon 66 is the polymer derived from adipic acid and hexamethylene diamine.

Nylon 6/66 is manufactured by different companies, in some instances with different percentages of the two monomers, possibly by different methods and presumably with different operating parameters. Accordingly, the properties of various nylon 6/66 copolymers may differ significantly. For example, the melting temperature decreases as the nylon 66 content is increased from 5% to 20 mole %.

When other nylons such as type 6.12 are used as the polyamide in the polymer blend of the oxygen barrier layer, numerous gels develop in the core layer of the five layer film and in some instances cracks develop. The gels may be due to EVOH-nylon 6.12 incompatibility or chemical reaction between the two polymers. The cracks probably develop because the polymer blend is not stretching uniformly during the orientation. These numerous gels and cracks are undesirable in films for commercial use to package foodstuffs and indicate potential weak spots in the film integrity and permeability properties.

A preferred nylon is a nylon 6/66 copolymer having a melting point of about 195° C., which has a reported nylon 6 component content of about 85 mole % and a nylon 66 component content of about 15 mole % and which is commercially available from Allied Chemical Co. of Morristown, N.J., U.S.A. under the trademark CAPRON XTRAFORM™ 1539F.

The core layer must be at least 80% by weight EVOH and optionally may contain from 0–20 wt. % of nylon. Use of greater amounts of nylon (e.g. greater than 10% and particularly greater than 20%) results in undesirably high oxygen permeability.

The second and fourth layers are disposed on either side of the core layer and provide good interlayer adhesion characteristics to the multilayer structure. Either or both of these layers may also contribute to the shrinkability and/or optical properties of the inventive film. The composition of each of the second and fourth layers comprises at least 10% of a first copolymer of ethylene and at least one $C_4$–$C_8$ α-olefin, said copolymer having a density of from 0.900 to 0.915 $g/cm^3$ and a melt index of less than 1.0 dg/min.. This first copolymer is a very low density polyethylene.

The expression very low density polyethylene ("VLDPE") sometimes called ultra low density polyethylene ("ULDPE"), as used herein refers to substantially linear polyethylenes having densities below about 0.915 $g/cm^3$ and, possibly as low as 0.86 $g/cm^3$, and having at least one melting point of at least 90° C. This expression does not include ethylene alpha olefin copolymers of densities below about 0.90 $g/cm^3$ with elastomeric properties and referred to as elastomers. Some elastomers are also referred to by at least one manufacturer as "ethylene alpha olefin plastomers", but other manufacturers have characterized VLDPE as an ethylene α-olefin with plastomeric properties. However, as hereinafter explained, ethylene alpha-olefin elastomers or plastomers may be advantageously used in the practice of this invention as a minor constituent in certain layers of this multilayer film. VLDPE does not include linear low density polyethylenes (LLDPE) which have densities in the range of 0.915–0.930 $gm/cm^3$, but it is contemplated that LLDPE may optionally be blended into one or more of the layers. VLDPE's as the term is used herein may be made by a variety of processes including solution or fluidized bed processes using a variety of catalysts including traditional Ziegler-Natta, single-site constrained geometry or metallocene catalysts.

VLDPE comprises copolymers (including terpolymers) of ethylene with alpha-olefins, usually 1-butene, 1-hexene or 1-octene, and in some instances terpolymers, as for example of ethylene, 1-butene and 1-hexene. A process for making VLDPEs is described in European Patent Document publication number 120,503 whose text and drawing are hereby incorporated by reference into the present document.

As for example described in Ferguson et al. U.S. Pat. No. 4,640,856 and Lustig et al. U.S. Pat. No. 4,863,769, VLDPEs are capable of use in biaxially oriented films and have superior properties to comparably made films having LLDPEs. These superior properties include higher shrink, higher tensile strength and greater puncture resistance.

Suitable VLDPEs include those manufactured by Dow Chemical Company, Exxon Chemical Company and Union Carbide Corporation.

The composition of each of the second and fourth layers also comprises at least 10% of a second copolymer of ethylene with from 4 to 18% of a vinyl ester or alkyl acrylate, and, and at least 10% of an anhydride-modified third copolymer of ethylene with at least one α-olefin, a vinyl ester or an alkyl acrylate, and from 0 to 30% of a fourth copolymer of ethylene and at least one $C_3$–$C_8$ α-olefin having a density less than 0.900 g/cm$^3$ and a melting point less of less than 85° C. The preferred second copolymer is an ethylene vinyl acetate copolymer.

The expression "ethylene vinyl acetate copolymer" (EVA) as used herein refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts.

The composition of the second layer may be identical or different from that of the fourth layer within the parameters of the above defined structure. For example the specific first, second and third polymers used may differ from one layer to the other or they may be partially or completely the same or in the same or different amounts. Also, the optional fourth polymer and other ingredients not required by this invention may also be present in one or both layers, and the relative thicknesses of each layer may vary. Beneficially the second layer will often be thicker than the fourth layer to provide good moisture barrier properties in addition to good shrinkability. The optional fourth component is often referred to as a "plastomer".

The first copolymer of either or both of the second and fourth layers may comprise from 10 to 70% of each respective layer. The second copolymer of either or both of the second and fourth layers may comprise from 10 to 40% of each respective layer. The third copolymer of either or both of the second and fourth layers may comprise from 10 to 60% of each respective layer. The fourth copolymer of either or both of the second and fourth layers may comprise at least 10% of each respective layer.

The fifth layer provides mechanical strength, shrinkability, abrasion resistance and resists burn through during heat sealing. This fifth layer is typically sufficiently thick to provide support, heat shrinkability, and impart strength to the packaging film wall in order to withstand the shrinking operation, handling pressures, abrasion, and packaging with a foodstuff. As an outer surface layer of the film, the fifth layer provides a desirable glossy appearance. Advantageously, the fifth layer comprises at least 30%, preferably at least 40% of a first copolymer of ethylene with a minor proportion of one or more $C_4$–$C_8$ alpha-olefins, which may provide a water vapor barrier which resists moisture permeation. High moisture barrier properties are desirable to avoid weight loss and undesirable drying of the enclosed food product. This first copolymer has a density of from 0.900 g/cm$^3$ to 0.915 g/cm$^3$ and a melt index of less than 1.0 dg/min. and is often termed a VLDPE.

The fifth layer further comprises at least 10 wt. % of a second copolymer of ethylene with from 4 to 18% (based on the weight of the second copolymer) of a vinyl ester or alkyl acrylate. Preferably, this second copolymer comprises EVA. Optionally, included in this fifth layer is from 0 to 30% of a third copolymer of ethylene and at least one $C_3$–$C_8$ α-olefin having a density less than 0.900 g/cm$^3$ and a melting point less than 85° C. This third copolymer is often termed a "plastomer" and may also have a average molecular weight distribution ($\overline{M}_w/\overline{M}_n$) less than 3, e.g. about 2. Processing aides such as slip agents, anti-block agents and the like may also be incorporated into the fifth layer as well as into other layers. Such processing aids are typically used in amounts less than 10% and preferably less than 5% of the layer weight. A preferred processing aid for use in the outer layer of the film is a fluoroelastomer. The above ingredients are admixed together and extruded to provide a uniformly blended layer having good strength, processability, high shrinkage characteristics and good optical properties including high gloss. Addition of the third copolymer, in particular, contributes to good optical and shrink properties. Advantageously, the fifth layer may consist essentially of the first and second copolymers with or without the third copolymer and with or without a minor amount (<10%) of processing aid.

The multilayer film of the invention may be made by conventional processes including e.g. slot cast or blown film processes, but preferably will be made by an orientation process, especially under conditions to produce a film which is heat shrinkable at 90° C. or less. For example, a packaged foodstuff having a heat shrinkable film enclosure according to the invention will advantageously cling to the foodstuff even after opening. Non-shrink bags have a tendency to fall away from the sides of the enclosed product once the vacuum is broken by either intentional or accidental opening. Once the film separates from the enclosed article surface, oxygen comes into contact with the article surface and product defects on susceptible products such as ham may occur. Some prior art films and bags are nonshrink bags which suffer from this defect thereby causing spoilage and waste when used to package perishable foodstuffs.

The five layer film of this invention may be manufactured by coextrusion of all layers simultaneously for example as described in U.S. Pat. No. 4,448,792 (Schirmer) or by a coating lamination procedure such as that described in U.S. Pat. No. 3,741,253 (Brax et al.) to form a relatively thick primary multilayer extrudate either as a flat sheet or, preferably, as a tube. This sheet or tube is oriented by stretching at orientation temperatures which are generally below the melting points for the predominant resin comprising each layer oriented. Stretch orientation may be accomplished by various known methods e.g. tentering which is commonly employed to orient sheets, or by the well-known trapped bubble or double bubble technique for orienting tubes as for example described in U.S. Pat. No. 3,456,044 (Pahlke). In this bubble technique an extruded primary tube leaving a tubular extrusion die is cooled, collapsed and then preferably oriented by reheating and inflating to form an expanded secondary bubble which is again cooled and collapsed. Preferred films are biaxially stretched. Transverse direction (TD) orientation is accomplished by the above noted inflation to radially expand the heated film which is cooled to set the film in an expanded form. Machine direction (MD) orientation is preferably accomplished with the use of sets of nip rolls rotating at different speeds to stretch or draw the film tube in the machine direction thereby causing machine direction elongation which is set by cooling. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g. at 90° C. or lower. Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films). According to the present invention one or more of the essential five film layers may be oriented either uniaxially or biaxially by axial stretching at temperatures low enough to produce low temperature, high shrink multilayer films. Such heat shrinkable multilayer films will have at least 10% shrink in at least one direction at 90° C., but preferably will have at least 20% shrink at 90° C. in at least one direction (preferably both directions) and advantageously may have at least 30% shrink at 90° C. in at least one direction, and preferably may have at least 25% in both M.D. and T.D. directions, and beneficially may have at least 10% shrink at 74° C. in both M.D. and T.D. directions and preferably at least 15% (more preferably at least about 20%) in at least one direction at 74° C.

The general annealing process by which biaxially stretched heat shrinkable films are heated under controlled tension to reduce or eliminate shrinkage values is well known in the art. If desired, films of the present invention may be annealed to produce lower shrinkage values as desired for the particular temperature. The stretch ratio during orientation should be sufficient to provide a film with a total thickness of between about 1.0 and 4.0 mils. The MD stretch ratio is typically 2½–6 and the TD stretch ratio is also typically 2½–6. An overall stretch ratio (MD stretch multiplied by TD stretch) of about 6¼x–36x is suitable.

The preferred method for forming the multilayer film is coextrusion of the primary tube which is then biaxially oriented in a manner similar to that broadly described in the aforementioned U.S. Pat. No. 3,456,044 where the primary tube leaving the die is inflated by admission of a volume of air, cooled, collapsed, and then preferably oriented by reinflating to form a secondary tube termed a "bubble" with reheating to the film's orientation (draw) temperature range. Machine direction (MD) orientation is produced by pulling or drawing the film tube e.g. by utilizing a pair of rollers traveling at different speeds and transverse direction (TD) orientation is obtained by radial bubble expansion. The oriented film is set by rapid cooling. In the following examples, all five layers were coextruded as a primary tube which was cooled upon exiting the die by spraying with tap water. This primary tube was then reheated by radiant heaters with further heating to the draw temperature (also called the orientation temperature) for biaxial orientation accomplished by an air cushion which was itself heated by transverse flow through a heated porous tube concentrically positioned around the moving primary tube. Cooling was accomplished by means of a concentric air ring.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as E-VAs, or other ester polymers, very low density polyethylene (VLDPE), linear low density polyethylene (LLDPE), low density polyethylene (LDPE), high density polyethylene (HDPE), nylons, ionomers, polypropylenes, or blends thereof. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In some preferred embodiments of the invention it is preferred to crosslink the entire film to broaden the heat sealing range. This is preferably done by irradiation with an electron beam at dosage levels of at least about 2 megarads (MR) and preferably in the range of 3 to 8 MR, although higher dosages may be employed. Irradiation may be done on the primary tube or after biaxial orientation. The latter, called post-irradiation, is preferred and described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking enhancer added to one or more of the layers, as for example described in U.S. Pat. No. 4,055,328 (Evert et al.). The most commonly used crosslinking enhancers are organic peroxides such as trimethylpropane and trimethylacrylate.

These performance levels are desirable for shrink packaging foodstuffs such as roast beef, poultry breasts and ham which are susceptible to discoloration and spoilage in the presence of oxygen.

The following are examples and comparative examples given to illustrate the present invention.

Experimental results and reported properties of the following examples are based on the following test methods or substantially similar test methods unless noted otherwise.

Tensile Strength: ASTM D-882, Method A

% Elongation: ASTM D-882, Method A

Haze: ASTM D-1003-52

Gloss: ASTM D-2457, 45° angle

1% Secant Modulus: ASTM D-882, Method A

Oxygen Gas Transmission Rate ($O_2GTR$) : ASTM D-3985-81

Water Vapor Transmission Rate (WVTR): ASTM F 1249-90

Elmendorf Tear Strength: ASTM D-1992

Gauge: ASTM D-2103

Melt Index: ASTM D-1238, Condition E (190° C.) (except for propene-based (>50% $C_3$ content)polymers tested at Condition TL(230° C.))

Melting point: ASTM D-3418, DSC with 5° C./min heating rate

Surface Energy (Wetting Tension):ASTM D-2578-84

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C." means a film having an unrestrained shrinkage value of at least 10% in at least one direction.

Shrink Force: The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the traverse direction. The average thickness of the film samples was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

$$\text{Shrink Force (g/mil)} = F/T$$

wherein F is the force in grams and T is the average thickness of the film samples in mils.

Impulse Seal Range:

The impulse sealing range test determines the acceptable voltage ranges for impulse sealing plastic films. A Sentinel Model 12-12AS laboratory sealer manufactured by Packaging Industries Group, Inc., Hyannis Mass., U.S.A. was used. This impulse sealer is equipped with a replacement sealing ribbon for a Multivac AG100 brand packaging machine. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage are set at the following conditions:

0.5 seconds impulse time (upper ribbon only)

2.2 seconds cooling time 50 psi (345 kPa) jaw pressure 0.3 gallon per minute (1 liter per minute) of cooling (about 75° F. (22° C.)) water flow One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is then determined for a sample having two sheet portions by placing it in the sealer and then activating the seal bar. The film sample is manually pulled with about 0.5 lbs. of force and the voltage which does not cause burn through or significant distortion of the seal is determined.

Seal Strength Test:

Five identical samples of film are cut 1 inch (2.54 cm) wide and at least 5 inches (77 cm) long with a 1 inch (2.54 cm) wide seal portion centrally and transversely disposed. Opposing end portions of a film sample are secured in opposing clamps in a temperature controlled chamber of an Instron 4501 Universal Testing Instrument. The film is secured in a taut snug fit between the clamps without stretching prior to beginning the test. The test chamber door is closed and the chamber is heated to the test temperature at which time the instrument is activated to pull the film via the clamps traverse to the seal at a uniform rate of 5 inches (127 cm) per minute until failure of the film (breakage of film or seal, or delamination and loss of film integrity). The lbs. at break are measured and recorded. The test is repeated for five samples and the average lbs. at break reported.

Unless otherwise indicated, the impulse seals tested for seal strength were made using the equipment described in the impulse seal range test description above with controls similarly set but having a cooling time of about 8 seconds.

The hot bar seals of various tested films were made similar to one another using settings of at 500° F. (260° C.) and 0.5 seconds dwell time.

Seal Creep:

The Seal Creep to Failure Test is designed to be an accelerated cook-in simulation to determine resistance to seal failure and/or loss of film integrity of a processing film over time. In the test, five samples of ½ inch (12.7mm) wide film is cut from one or more similar sealed films with the cuts made perpendicular to the seal so that each film sample contains a ½ inch wide seal and five inches of film on either side of the seal. This produces samples which are each 10 inches (25.4 cm) long by ½ inch (12.7 mm) wide with a seal in the middle. The opposing top and bottom long portions of a film sample containing a centrally disposed seal are securely attached to respective flat plate clamps which extend over the width of the film end. The top film clamp is attached to a fixture while the opposing bottom clamp has an attached weight (for a total weight of about 1 lb. (454 g). The weighted clamp and lower film portion including the seal area are submersed into a circulating bath of temperature controlled water set at 165° F. (74° C.). The film seal area is positioned about 2–3 inches below the surface of the water and the film strip with attached weight is perpendicular to the surface of the water. Upon submersion, a timer is started and the film and weight are observed and the time noted at which the weight drops signifying film seal failure and/or loss of film integrity. The film and weight are observed continuously for the first fifteen minutes and then checked at least every 15 minutes thereafter up to a total test period of 180 minutes. The average for five test samples is reported. Minimum and maximum values measured for the set may also be reported.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. All percentages are by weight unless indicated otherwise.

Examples 1∝6

In Examples 1–3, three biaxially stretched, heat shrinkable, multilayer films of the present invention were made. The layers of each multilayer film were coextruded and biaxially stretched according to a coextrusion type of tubular orientation process.

Examples 1–3 are five layered films. However, films of six or more layers are also contemplated by the present invention. The inventive multilayer films may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

For Examples 1–3, one extruder was used for each layer and the heat plastified resins from each extruder were introduced to a 5 layer spiral plate coextrusion die from which the resins were coextruded at an first/second/third/fourth/fifth layer thickness ratio of about 16:43:11:9:21 for Examples 1–3.

In Examples 1–3, for each layer, the resin or resin mixture was fed from a hopper into an attached single screw extruder where the resin and/or mixture was heat plastified and extruded through a five layer coextrusion spiral plate die into a primary tube. The extruder barrel temperatures for the third (core)layer was about 350°–400° F. (177°–204° C.); for the first (inner)and second (intermediate) layer was about 300° F.(149° C.) ; for the fourth (intermediate) layer was about 340° F. (171° C.) and for the fifth (outer) layer was about 330°–340° F. (166°–171° C). The extrusion die had an annular exit opening of 3 inch diameter with a 0.060 inch gap (7.62cm×0.152 cm). The coextrusion die temperature profile was set from about 340° F. to 410° F. (171°–210° C.). The extruded multilayer primary tube was cooled by spraying with cold tap water (about 7°–14° C.).

The cooled primary tube was flattened by passage through a pair of nip rollers whose speed was controlled to neck down the primary tube to adjust the tube circumference or flatwidth. In Examples 1–3, a flattened tube of about 4⅛ inches (10.5cm) flatwidth was produced. The cooled flattened primary tube was reheated, biaxially stretched, and cooled.

The cooled film was flattened and the biaxially stretched and biaxially oriented film was wound on a reel. The machine direction (M.D.) draw or orientation ratio was about 3.7:1 to 3.8:1 and the transverse direction (T.D.) bubble or orientation ratio was about 2.8:1 to 2.9:1 for all the films. The draw point or orientation temperature was below the predominant melting point for each layer oriented and above that layer's glass transition point. Draw point temperature, bubble heating and cooling rates and orientation ratios are generally adjusted to maximize bubble stability and throughput for the desired amount of stretching or orientation. The resultant films of Examples 1–3 having an average gauge of 2.5 to 2.7 (See Table 2) were biaxially oriented and had an excellent appearance.

Examples 4 and 5 were made by irradiating at a level of 4 Mrad by electron beam after orientation and according to methods well known in the art to cause crosslinking, especially of the polymeric second and fourth adhesive layers and the outer (fifth) polymeric layer. These examples (4 and 5) were also corona treated to make the first layer have adherability to proteinaceous foodstuffs such as meat. This property termed "meat adhesion" is important for applications where it is desirable to retain juices within the meat during cooking or pasteurization while in the bag. This is called preventing "cook-out" in which pockets of fat and juices can form causing an undesirable appearance, loss of juices and loss of weight. In other applications (often termed "cook and strip") it is desirable to be able to easily remove the bag from a product following cooking or pasteurization; and in these applications the film is not corona treated and the inner layer advantageously does not adhere to the enclosed foodstuff e.g. meat. In these applications a worker may easily remove the bag after processing for further processing, repackaging for retail sale or for use.

For all of the Examples 1–3, the first layer (which was the interior surface of the tubular film) comprised a random copolymer of propene and ethene having a DSC melting point of 133° C., a reported density of 0.895 g/cm$^2$, a melt index of 5 g/10 min., and which is commercially available under the trademark Eltex P KS 409 from Solvay & Cie of Brussels, Belgium. In examples 1, 2,and 3, the first layer comprised, respectively, 100%, 90%, and 80% by weight of the propene-ethene random copolymer, and 0%, 10%, and 20% by weight of an LLDPE-based adhesive. The LLDPE-based adhesive was an extrudable rubber-modified, anhydride-modified linear low density polyethylene based tie layer resin having the following reported properties: density of 0.912 g/cm$^3$, melt index of 1.5 dg/min., a Vicat softening point of 98° C., a melting point of about 125° .C. and is available under the trademark Plexar® PX380 from Quantum Chemical Corporation, Cincinnati, Ohio, U.S.A..

The fifth layer of Examples 1–3 (which was the exterior surface of the tube) contained an ethylene-α-olefin copolymer of very low density polyethylene sold by Dow Chemical Company of Midland, Mich., U.S.A. under the trademark Attane XU 61509.32 which is a copolymer of ethylene and octene-1 reportedly having a melt index of about 0.5 dg/min and a density of about 0.912 g/cm$^3$, with a Vicat softening point of 95° C. and a melting point of about 122° C. Also in the fifth layer was a copolymer of ethylene and vinyl acetate (EVA) as a component of the blend of resins. This EVA is available from Exxon Chemical Company of Houston Tex., U.S.A. under the trademark Escorene LD 701.06 and has the following reported properties: 10.5% vinyl acetate content; 0.93 g/cm$^3$ density; 0.19 dg/min. melt index; and a melting point of about 97° C. In Examples 1, 2 and 3, the fifth (outer) layer compositions were identical and comprised 70.6% of the ethylene-α-olefin copolymer which was blended with 25% of the EVA copolymer and 4.4% by weight of a slip processing aid sold under the trademark Ampacet 100031 by Ampacet Corp. of Tarrytown, N.Y., U.S.A.

For Examples 1–3, the second and fourth (intermediate) layers were each identical blends comprising 17.5% of the same EVA copolymer used in the fifth layer with 42.5% of the same very low density polyethylene used in the fifth layer, and 40% of the same extrudable rubber-modified, anhydride-modified linear low density polyethylene based tie layer adhesive resin (Plexar® PX380) used in the first layer. The second and fifth layers of each of Examples 1–3 were identical to one another except that the fourth layers of examples 1–3 were all thinner than the corresponding second layers.

For Examples 1–3, each core layer comprised a 90:10 percent by weight blend of a saponified ethylene-vinyl acetate copolymer (EVOH) with a nylon. A premix was formed by blending 90% EVOH with 10% nylon. This premixed blend was then added to an extruder hopper for extrusion as the core layer. The EVOH was a commercially available copolymer sold by Eval Company of America of Lisle, Ill., U.S.A. under the trademark EVAL E105A and had the following reported properties: an ethylene content of 44 percent by weight, a melt index of 5.5 dg/min, a density of 1.14 and a melting point of 165° C. The nylon was a commercially available nylon 6/66 copolymer sold by Allied Chemical Company under the trademark CAPRON XTRAFORM 1539F and had a reported nylon 6 content of 85 mole % and nylon 66 content of 15 mole % with a DSC melting point of about 195° C., and a density of 1.13 g/cm³.

Comparative Example 6 is not of the invention, but is a prior art example of a commercial film used for cook-in packaging of e.g. hams. The comparative film of Example 6 is believed to be a six layer film of the structure $C_3$-$\alpha$-olefin copolymer/EVA/Adhesive/EVOH(44 mole % ethylene)/Adhesive/EVA. All of the examples including the comparative example are heat shrinkable at 90° C. Example 6 is believed to have a composition and layer thicknesses of about 0.5 mil for the 1st ($C_3$ copolymer)layer; 0.6 mil for the combined 2nd (EVA) layer and 3rd (adhesive) layer; 0.2 mil for the 4th (EVOH)layer; and combined 1.2 mils for the 5th (adhesive) and 6th (EVA) layer.

Layer formulations of Example 1–5 are reported in Table 1. Physical properties of the films of Examples 1–6 were measured and are reported in Tables 2–4.

TABLE 1

| Ex. No. | First Layer (Inner) | Second Layer | Third Layer (Core) | Fourth Layer | Fifth Layer (Outer) |
|---|---|---|---|---|---|
| 1 | 100% $C_3C_2$ | 42.5% VLDPE<br>17.5% EVA<br>40% Adhesive* | 90% EVOH<br>10% Nylon | Same as 2nd Layer | 70.6% VLDPE<br>25% EVA<br>4.4% Processing Aid |
| 2 | 90% $C_3C_2$<br>10% Adhesive* | Same as Ex. 1 | 90% EVOH<br>10% Nylon | Same as 2nd Layer | 70.6% VLDPE<br>25% EVA<br>4.4% Processing Aid |
| 3 | 80% $C_3C_2$<br>20% Adhesive* | Same as Ex. 1 | 90% EVOH<br>10% Nylon | Same as 2nd Layer | 70.6% VLDPE<br>25% EVA<br>4.4% Processing Aid |
| 4 | Same as Ex. 1 | Same as Ex. 1 | Same as Ex. 1 | Same as Ex. 1 | Same as Ex. 1 |
| 5 | Same as Ex. 3 | Same as Ex. 3 | Same as Ex. 3 | Same as Ex. 3 | Same as Ex. 3 |

*The adhesive is a rubber-modified, anhydride-modified LLDPE adhesive (Plexar PX 380).

TABLE 2

| Ex. No. | Avg GAUGE mil (micron) | FLAT WIDTH (mm) | ELONGATION AT BREAK % at RT MD/TD | TENSILE STRENGTH × 10³ psi at RT (MPa) MD/TD | SHRINK at 90° C. % MD/TD | SHRINK at 74° C. % MD/TD | SHRINK FORCE at 90° C. gm/mil (Kg/cm) MD/TD | SHRINK FORCE at RT gm/mil (Kg/cm) MD/TD | SHRINK FORCE at 74° C. gm/mil (Kg/cm) MD/TD | SHRINK FORCE at RT gm/mil (Kg/cm) MD/TD |
|---|---|---|---|---|---|---|---|---|---|---|
| 1 | 2.53 (64.3) | 314 | ND | ND | 17/35 | 8/20 | 84/163 (33/64) | 57/149 (22/59) | 36/168 (14/66) | 22/159 (9/63) |
| 2 | 2.77 (70.4) | 298 | ND | ND | 20/35 | 10/23 | 114/173 (45/68) | 77/155 (30/61) | 81/158 (32/62) | 59/154 (23/61) |
| 3 | 2.69 (68.3) | 298 | ND | ND | 21/36 | 9/24 | 113/170 (45/67) | 59/88 (23/35) | 88/173 (35/68) | 72/165 (28/65) |
| 4 | 2.31 (58.7) | ND | 105/215 | 7.0/7.0 | 14/31 | 5/18 | 51/168 (20/66) | 35/149 (14/59) | 43/155 (17/61) | 37/144 (15/57) |
| 5 | 2.66 (67.6) | ND | 144/217 | 8.5/7.0 | 19/34 | 9/21 | 121/157 (48/62) | 83/149 (33/59) | 85/166 (33/65) | 68/157 (27/62) |
| 6 | 2.48 (63.0) | 337 | 126/85 | 6.5/6.6 | 30/42 | 12/19 | 77/115 (30/45) | 60/92 (24/36) | 68/108 (27/43) | 54/78 (21/31) |

ND = NOT DETERMINED
RT = ROOM TEMPERATURE (~20–23° C.)

TABLE 3

| EX. No. | 1% Secant Modulus MD/TD MPa | TEAR STRENGTH MD/TD g/μ | DYNAMIC PUNCTURE cmKg/μ | HOT H₂O PUNCTURE 95° C. μ/seconds | O₂GTR†* at RT 0% RH | HAZE % | GLOSS AT 45° ANGLE |
|---|---|---|---|---|---|---|---|
| 1 | ND | ND | ND | ND | 11 (64) | 7.3 | 71 |
| 2 | ND | ND | ND | ND | ND | 19.1 | 44 |
| 3 | ND | ND | ND | ND | ND | 22.3 | 45 |
| 4 | 323/293 | 1.3/1.1 | 0.04 | 79.2/22** | 12 (71) | 9.2 | 68 |
| 5 | 293/268 | 1.0/1.4 | 0.04 | 66.3/14 | 14 (69) | 19.3 | 45 |
| 6 | 352/375 | 0.55/0.55 | 0.03 | 69.6/29 | 13 (61) | 18.4 | 53 |

ND = NOT DETERMINED
RT = ROOM TEMPERATURE (~20–23° C.)
RH = RELATIVE HUMIDITY
†Oxygen gas transmission rate (O₂GTR) in units of cm³ per meter² per 24 hours at 1 atmosphere for the film tested.
*For O₂GTR the film thickness is below the rate in microns ( ).
**Average of 5 values; a sixth value in excess of 120 seconds for a 89μ film was also obtained.

TABLE 4

| Ex. No. | SURFACE ENERGY (dynes/cm) | IMPULSE SEAL RANGE min./max. (volts) | SEAL CREEP TO FAILURE at 165° F. (74° C.) avg./min./max. (minutes) | SEAL STRENGTH Impulse Seal at 160° F. (71° C.) at 40 v/43 v/46 v/49 v (g/cm) | SEAL STRENGTH Hot Bar Seal at RT/160/170/180/190° F. (RT/71/77/82/88° C.) (g/cm) |
|---|---|---|---|---|---|
| 1 | 31 | ND | ND | ND | ND |
| 2 | ND | ND | ND | ND | ND |
| 3 | 32 | ND | ND | ND | ND |
| 4 | 34 | 44/46 | 115/<1/180 | 697/731/738/708 | 1939/958/ND/ND/677 |
| 5 | 35 | 35/46 | 137/26/180 | 627/606/618/633 | 1630/1010/ND/ND/688 |
| 6 | 36 | 32/50 | 1/<1/4 | 604/506/590/564 | ND/792/677/717/651* |

ND = NOT DETERMINED
RT = ROOM TEMPERATURE (~20–23° C.)
*This was a factory seal and the sealing method was undetermined.

The results in Table 2 demonstrate that films according to the present invention have good physical properties. The elongation at break, tensile strength, unrestrained shrink, and shrink force properties of Examples 1–5 of the invention are comparable to commercially available films for packaging cook-in foods as exemplified by comparative Example 6. Although comparative Example 6 has slightly better unrestrained shrink values than the films of the Examples 1–5, all of the inventive films have adequate and excellent unrestrained shrink values for many utilities including packaging of foodstuffs. The elongation at break and tensile strength values of the Examples 4 and 5 are generally as good or better than those reported for the comparative film of Example 6. For packaging articles, the reported elongation at break values for the example films of the invention have very good extensibility which is adequate to accommodate any stretching encountered under typical packaging and process conditions.

The shrinkage values for Examples 1–5 are good for a film containing EVOH. The transverse direction values are all greater than 30° at 90° C. and shrinkage at lower temperatures of 74° C. are similar to the 74° C. shrinkage values for comparative Example 6. The present invention is capable of producing films with even higher shrinkage values in both directions at the test temperatures. Therefore the inventive films may have desirably high shrinkage values which may be greater than 20% in either or both directions at 90° C. and beneficially may be greater than 30%. High shrinkage especially at 90° C. or lower is an advantage in packaging articles to provide close contact between the film and the enclosed article surface which prevents or lessens damage which may be caused by contact with oxygen or by movement of the article within the package. A further advantage is that good shrinkage values may be obtained at a lower temperature thereby using a shrinking process which has lower energy requirements.

Also the shrink forces reported for Examples 1–5, especially the residual shrink forces, are at levels desirable to hold the film in close contact with the enclosed article not only during possible processing subsequent to packaging e.g. pasteurization, but also at room temperature. The residual shrink force at room temperature is important e.g. when a package may be opened exposing one end to the deleterious effects of exposure to the environment. Films and bags having a high residual shrink force such as those values reported for Example 1–5 of the invention have continued close contact between film and article even after opening. The measured values of Examples 1–5 indicate that the film would be kept in close contact with an enclosed article and continue to maintain its protective functions.

Referring now to Table 3, the inventive films of Examples 4 and 5 demonstrate lower modulus values indicating a softer film yet having superior tear strength to the tested commercially available comparative film sample and similar puncture resistance values. The oxygen barrier properties of the test films are all excellent for applications requiring low permeability (a high barrier) to oxygen. The optical properties of Examples 1–5 show that the inventive films of Examples 1 and 4 which have an unblended first layer that consists essentially of a propene copolymer have superior low haze and high gloss relative to the blended structures of Examples 2, 3 and 5. Comparative Example 6 is also believed to have an unblended first layer, however, the comparative example has a much hazier and less glossy appearance than the inventive examples having an unblended first layer.

Referring now to Table 4, the film samples of Examples 4 and 5 were corona treated whereas Examples 1–3 were not. The difference in surface energy or wetting tension is shown by the dynes per cm values. The surface energy values obtained for the films of Examples 1 and 3 indicate films suitable for cook and strip applications or films for use where meat adhesion is not a required or desired property. The surface energy value for comparative Example 6 suggests that this film has been corona treated. The impulse seal range for the irradiatively crosslinked Examples 4–5 are all sufficiently broad for use and sealing by commercially available sealing equipment including hot bar or impulse sealers.

The seal creep to failure and seal strength data demonstrates a film having strong seals and superior high resistance to delamination relative to the film of the comparative example. The first set of seal strength data demonstrates that impulse seals of the inventive films may be made over a range of voltages from 40–49 volts which are unexpectedly superior at elevated temperatures to the prior art film of comparative Example 6. The second set of seal strength data examines hot bar seals made at 500° F. (260° C. ) and 0.5 seconds dwell time relative to the factory seal on the commercially available bag of Example 6. Again the inventive films show unexpectedly high and superior seal strength.

Surprisingly, the seal creep at failure test demonstrates the dramatic superiority of the hot bar seals of the films of the present invention to the comparative example factory seal at a typical cook-in temperature of 165° F. (740C. ) . The unexpectedly good seal strength, particularly under simulated cook-in temperatures and conditions, is believed to be due to the particular inventive formulation-structure combination employed in the multilayer film.

The films of examples 4 and 5 were formed into bags for processing and packaging cook-in food. These bags along with bags of comparative example 6 were stuffed with ground meat and cooked at 165° F. (74° C. ) in steam heat for eight hours followed by chilling overnight. The meat adhesion, purge control, delamination resistance, and seal strength characteristics of the films were all evaluated. The films of examples 4 and 5 were as good or better than the comparative example in all the above characteristics, and demonstrated good purge control, high delamination resistance, good meat adhesion, and good seal strength. None of the tested films of examples 4 and 5 delaminated during either thermal processing or after film removal from the cook-in product. None of the films of examples 4 and 5 exhibited seal failure over the 8 hour cook period or after chilling overnight. Bags of examples 4 and 5 were also subjected to a more severe cook procedure of stuffing and cooking at a temperature of 180° F. (82° C. ) in steam heat for 8 hours to further test the heat seals and none of these bags showed seal failure.

Examples 7–10

A five layer tubular film designated here as Example 7 was made by a biaxial stretching orientation process. This process was similar to that disclosed above for making the films of Examples 1–3, except as noted below. Example 8 is the film of Example 7 which has been irradiated by electron beam to a level of about 4 Mrad. Example 9 is the irradiated film of example 8 which has also been corona treated. Example 10 is a comparative example (not of the invention) which is further described below.

These examples demonstrate the effect of certain properties of irradiation and corona treatment to, respectively, cross-link and surface treat(incorporate polar groups into) the film. It also demonstrates use of a core layer which consists essentially of EVOH and use of a sealing layer using a higher melting point propene copolymer. In all of the examples below, a core layer 100 wt. % EVOH (EVAL E105A) was used having an ethylene content of 44 mole %.

The films of Examples 7–9 each had an inner heat sealable layer which comprised 100% by weight of an propylene-ethylene copolymer which was sold by FINA Oil and Chemical Company of Dallas, Tex., U.S.A. under the trademark FINA 7371. This $C_3C_2$ copolymer reportedly had a melting point of about 143° C. (as measured by a differential scanning calorimetry (DSC), and a reported melt index of 3.5 g/10 minutes(at 230° C./2.16Kg). This resin also had a reported density(p) of 0.9 g/cm$^3$.

The extruder barrel temperatures for the third (core)layer was about 355°–365° F. (179°–185° C.); for the first (inner) and fourth (intermediate) layer was about 350°–375° F.(177°–191° C. ); for the second (intermediate) layer was about 320° F. (160° C. ) and for the fifth (outer) layer was about 340° F. (171° C. ). The coextrusion die temperature profile was set from about 350° F. to 365° F. (177°–185° C.).

For Examples 7–9, the second and Fourth (intermediate) layers were each identical blends comprising 17% of the same EVA copolymer with 53% of the same very low density polyethylene used in Example 1, and 30% of an extrudable anhydride-modified linear low density polyethylene based tie layer adhesive resin (Plexar® PX 360) having a melt index of 2 dg/min. , a density of 0.925 g/cm$^3$, and a melting point of about 125° C.

The fifth layer of Examples 7–9 (which was the exterior surface of the tube) contained 73.1 weight % of an ethylene-α-olefin copolymer of very low density polyethylene sold by Dow Chemical Company of Midland, Michigan, U.S.A. under the trademark Attane XU 61509.32 which is a copolymer of ethylene and octene-1 reportedly having a melt index of about 0.5 dg/min and a density of about 0.912 g/cm$^3$, with a Vicat softening point of 95° C. and a melting point of about 122° C. Also blended in the fifth layer was 22.5 wt. % of EVA(LD 701.06) and 4.4% by weight of the fluoroelastomer slip processing aid described in Example 1.

As in Examples 1–5, the first(inner) and fifth(outer) layers were connected to opposing sides of a third(core) layer (which comprises EVOH) by second and fourth (intermediate) layers which act in part as adhesive layers.

The EVOH core layer controlled the permeability of the film with regard to gases such as oxygen.

The inventive films of Examples 7–9 have a five layer structure which, if one refers to the Plexar resin containing layers as Adhesive (Ad) layers, may generally be identified as 100% $C_3C_2$/Ad/100% EVOH /Ad/73.1% EVA:22.5% VLDPE: 4.4% Proc. Aid. The 100% $C_3C_2$ layer is the inner layer of the tubular film. This film has relative layer thicknesses (1st to 5th layers) of 8.3%/63.7%/8.4%/3%/16.6% (the combined 4th and 5th layers were measured to be 19.6% with the 4th layer believed to be about 3%).

For Example 10 the layers and their composition were identical to example 7 except that a higher melt index ethylene α-olefin VLDPE was substituted for the 0.5 M.I. VLDPE(XU61509.32). The components were described more fully above with respect to Examples 1–3 and 7. The VLDPE (XU61520.01) used in the first, second and fourth layers of Example 10 was an ethylene-octene-1 copolymer having a reported density of 0.912 g/cm$^3$, a melt index of 1.0 dg/min., and a melting point of about 123° C., which was available from Dow Chemical Company under the trademark ATTANE XU 61520.01. The film of the Example 10 extruded very poorly and could not be made into a tubular film. The absence in the formulation of at least 10% of the copolymer of ethylene and at least one $C_4$–$C_8$ α-olefin having a melt index of less than 1.0 dg/min. and a density of from 0.900 to 0.915 g/cm$^3$ produced an unstable primary tube having poor dimensional stability and low melt strength which was insufficient to make a tubular biaxially stretched film. No film was able to be made and therefore no results are reported.

Various properties of the films of Examples 7–9 were measured and are reported in Tables 5 and 6 below.

Examples 11–16

Five layer tubular films designated here as Examples 11,12, and 14–16 were made by a biaxial stretching orientation process. This process was generally similar to that disclosed above for making the films of Examples 1–3, except as noted below. The layer formulations of the film examples are listed in Table 7. The resins used in these examples were the same as used in Examples 1–3, except that the second, fourth and fifth layers all included a resin designated in Table 7 as "Plastomer". This plastomer resin was a copolymer of ethylene and at least one $C_3$–$C_8$ α-olefin having a density less than 0.900 g/cm$^3$ and a melting point less than 85° C. In particular, the plastomer resin used was a commercially available copolymer predominantly of ethylene copolymer with butene-1 monomer and component having a reported density of about 0.885 g/cm$^3$, a melt index of 0.5 dg/min and a melting point of 68° C. and available under the trademark Tafmer A0585X from Mitsui Petrochemical Industries, Ltd. of Tokyo, Japan. Examples 11 and 12 were similarly made films that were processed to slightly

TABLE 5

| | TENSILE | | | | | | | SHRINK FORCE | | | IMPULSE |
|---|---|---|---|---|---|---|---|---|---|---|---|
| EX. NO. | AVG. GAUGE mil (μ) | STRENGTH at RT × 10$^3$ psi (mPa) | O$_2$GTR† at RT | HAZE % | GLOSS at 45° ANGLE | SHRINK at 90° C. % MD/TD | SHRINK at 74° C. % MD/TD | at 90° C. g/mil (Kg/cm) MD/TD | at RT g/mil (Kg/cm) MD/TD | SURFACE ENERGY dynes/ cm | SEAL RANGE VOLTS Min/Max |
| 7 | 2.82 (71.6) | ND | 7.3 (71) | 2.4 | 87 | 14/30 | 7/17 | 108/194 (43/76) | 80/166 (31/65) | 30 | ND |
| 8 | 3.06 (77.7) | ND | ND | 4.2 | 82 | ND | ND | ND | ND | 30 | 50+/50+ |
| 9 | 3.24 (82.3) | 9.7/8.9 (67/61) | 8.2 (76) | 5.7 | 78 | 18/31 | 8/17 | 107/195 (42/77) | 72/178 (28/70) | 37 | 50+/50+ |

ND = Not Determined
RT = ROOM TEMPERATURE (~20–23° C.)
† = Oxygen gas transmission rate (O$_2$GTR) in units of cm$^3$ per meter$^2$ per 24 hours at 1 atmosphere and 0% relative humidity for the film tested. For O$_2$GTR film thickness is listed below the rate in microns ( ).

TABLE 6

| EX. NO. | SEAL STRENGTH lbs/inch (Kg/cm) | | | |
|---|---|---|---|---|
| | at 160° F. | at 170° F. | at 180° F. | at 190° F. |
| 7 | ND | ND | ND | ND |
| 8 | 6.80 (1.2) | 5.40 (0.97) | 4.68 (0.84) | 5.25 (0.94) |
| 9 | 5.16 (0.92) | 4.57 (0.82) | 4.07 (0.73) | 3.52 (0.63) |

Referring to Tables 5 and 6, good physical properties are shown. Strong, oxygen barrier films were made having excellent optical properties. Very low haze and high gloss values are demonstrated. The surface energy values reflect that the film of Example 9 has been corona treated to provide a surface capable of high meat adhesion. The impulse seal range is peculiarly high and off the test scale and this is believed due to a combination of sealing through a relatively thick (i.e. greater than 2.6 mil (66 μ))film coupled with use of a high melting point propene copolymer to form the first (sealing) layer. Good shrinkage values at both 90° C. and 74° C. are demonstrated with good shrink force values at both elevated and room temperatures. Hot bar seals were made of the irradiated films of Examples 8 and 9 and again demonstrate unexpectedly strong seals over a wide range of elevated temperatures.

different flatwidths. Both films were irradiated by electron beam to a level of about 4 Mrad, and neither film was corona treated. Examples 14–16 were irradiated to different levels of 4 Mrad, 5 Mrad, and 6 Mrad, respectively. The films of examples 14–16 were all corona treated. Example 13 is a comparative example (not of the invention) which is further described below.

These examples demonstrate the effect of addition of the optional plastomer component to the film as well as the effect on certain properties of irradiation and corona treatment to, respectively, cross-link and surface treat (incorporate polar groups) the film. It also demonstrates use of a core layer which consists essentially of EVOH and use of a sealing layer using a preferred low melting point propene copolymer. In all of the examples below, a core layer 100 wt. % EVOH was used having an ethylene content of 44 mole %.

As in Examples 1–5, the first(inner) and fifth(outer) layers were connected to opposing sides of a third(core) layer (which comprises EVOH) by second and fourth (intermediate) layers which act in part as adhesive layers.

The EVOH core layer controlled the permeability of the film with regard to gases such as oxygen.

The inventive films of Examples 11, 12, and 14–16 each have a five layer structure with the 100% $C_3C_2$ layer being the inner layer of the tubular film. These films have relative layer thicknesses (1st to 5th layers)of 11.8%/43.1%/7.3%/

3%/34.8% (the combined 4th & 5th layers were measured to be 37.8% and the 4th layer is believed to be ~3).

Example 13 is a comparative example of a prior art, commercially available film believed to have a six layer structure as described above for comparative example 6, except that comparative example 13 is not corona treated.

Various properties of the films of Examples 11–16 were measured and are reported in Tables 8, 9, and 10 below.

TABLE 7

| Ex. No. | First Layer (Inner) | Second Layer | Third Layer (Core) | Fourth Layer | Fifth Layer (Outer)† | Sixth Layer | IRRADIATED (Mrad) | Corona |
|---|---|---|---|---|---|---|---|---|
| | | | Layer Composition | | | | | |
| 11 | 100% $C_3C_2$ | 37.5% VLDPE 17.5% EVA 30% Adhesive* 15% Plastomer | 100% EVOH | Same as 2nd Layer | 55.6% VLDPE 25% EVA 4.4% Processing Aid 15% Plastomer | — | 4 | NO |
| 12 | 100% $C_3C_2$ | 37.5% VLDPE 17.5% EVA 30% Adhesive* 15% Plastomer | 100% EVOH | Same as 2nd Layer | 55.6% VLDPE 25% EVA 4.4% Processing Aid 15% Plastomer | — | 4 | NO |
| 13** | 100% $C_3$-olefin | EVA | Adhesive | 100% EVOH | Adhesive | EVA | Yes | NO |
| 14 | 100% $C_3C_2$ | 37.5% VLDPE 17.5% EVA 30% Adhesive* 15% Plastomer | 100% EVOH | Same as 2nd Layer | 55.6% VLDPE 25% EVA 4.4% Processing Aid 15% Plastomer | — | 4 | YES |
| 15 | 100% $C_3C_2$ | 37.5% VLDPE 17.5% EVA 30% Adhesive* 15% Plastomer | 100% EVOH | Same as 2nd Layer | 55.6% VLDPE 25% EVA 4.4% Processing Aid 15% Plastomer | — | 6 | Yes |
| 16 | 100% $C_3C_2$ | 37.5% VLDPE 17.5% EVA 30% Adhesive* 15% Plastomer | 100% EVOH | Same as 2nd Layer | 55.6% VLDPE 25% EVA 4.4% Processing Aid 15% Plastomer | — | 8 | Yes |

**Comparative example believed to be irradiated but not corona treated.
*The adhesive is a rubber-modified, anhydride-modified LLDPE adhesive (Plexar PX 380).
†The exterior outer layer for examples 11–17, except comparative example 13 which is believed to be a six layer film with the sixth layer as the exterior outer layer.

TABLE 8

| Ex. No. | Avg GAUGE mil (micron) | FLAT WIDTH (mm) | ELONGATION AT BREAK % at RT MD/TD | TENSILE STRENGTH ×10³ psi at RT (mPa) MD/TD | SHRINK at 90° C. % MD/TD | SHRINK at 74° C. % MD/TD | SHRINK FORCE at 90° C. gm/mil (Kg/cm) MD/TD | SHRINK FORCE at RT gm/mil (Kg/cm) MD/TD | SHRINK FORCE at 74° C. gm/mil (Kg/cm) MD/TD | SHRINK FORCE at RT gm/mil (Kg/cm) MD/TD |
|---|---|---|---|---|---|---|---|---|---|---|
| 11 | 2.61 (66.3) | 329 | 85/150 | 10.8/7.8 (74/54) | 27/36 | 12/20 | 186/158 (73/62) | 101/132 (40/52) | 130/146 (51/57) | 85/138 (33/54) |
| 12 | 2.64 (67.1) | 378 | 113/134 | 9.9/8.0 (68/55) | 23/34 | 11/20 | 139/172 (55/68) | 82/136 (32/54) | 101/162 (40/64) | 78/150 (31/59) |
| 13 | 2.67 (67.8) | 302 | 149/92 | 5.6/6.2 (39/43) | 29/41 | 10/20 | ND | ND | ND | ND |
| 14 | 2.59 (65.8) | 240 | 137/181 | 9.7/7.4 (67/51) | 24/36 | 12/21 | 146/140 (58/55) | 85/121 (33/48) | 105/145 (41/57) | 71/133 (28/52) |
| 15 | 2.64 (67.1) | 241 | 105/167 | 9.2/7.1 (63/49) | 24/35 | 12/21 | 128/145 (50/57) | 79/134 (31/53) | 101/151 (40/59) | 73/142 (29/56) |
| 16 | 2.41 (61.2) | 241 | 106/146 | 9.4/6.9 (65/48) | 23/35 | 12/20 | 129/141 (51/56) | 80/133 (31/52) | 94/139 (37/55) | 74/132 (29/52) |

ND = NOT DETERMINED
RT = ROOM TEMPERATURE (~20–23° C.)

TABLE 9

| EX. No. | 1% Secant Modulus MD/TD MPa | TEAR STRENGTH MD/TD g/μ | DYNAMIC PUNCTURE cmKg/μ | HOT H₂O PUNCTURE 95° C. μ/seconds | $O_2GTR$† at RT 0% RH | 50% RH | HAZE* % | GLOSS* AT 45° ANGLE |
|---|---|---|---|---|---|---|---|---|
| 11 | 278/250 | 0.71/1.8 | ND | 71/>120 | ND | ND | 11 | 64 |
| 12 | 248/242 | 0.94/1.2 | ND | 74/58†† | ND | ND | 6 | 73 |
| 13 | 351/371 | 0.55/0.91 | 0.03 | 67/20 | 9 | ND | 15 | 60 |

TABLE 9-continued

| EX. No. | 1% Secant Modulus MD/TD MPa | TEAR STRENGTH MD/TD g/μ | DYNAMIC PUNCTURE cmKg/μ | HOT H$_2$O PUNCTURE 95° C. μ/seconds | O$_2$GTR† at RT 0% RH | 50% RH | HAZE* % | GLOSS* AT 45° ANGLE |
|---|---|---|---|---|---|---|---|---|
| 14 | 392/384 | 1.2/1.8 | 0.03 | 71/>120 | (64) ND | 13 (58) | 11 | 69 |
| 15 | 391/373 | 1.4/1.2 | 0.03 | 74/>120 | ND | 12 (64) | 11 | 69 |
| 16 | 389/392 | 1.9/1.8 | 0.03 | 61/>120 | ND | 8 (69) | 10 | 71 |

ND = NOT DETERMINED
RT = ROOM TEMPERATURE (~20–23° C.)
RH = RELATIVE HUMIDITY
†Oxygen gas transmission rate (O$_2$GTR) in units of cm$^3$ per meter$^2$ per 24 hours at 1 atmosphere for the film tested. For O$_2$GTR the film thickness is below the rate in microns ( ).
*Values for powder coated film (Values for Example 13 after wiping off powder were 11 and 65). respectively).
††Average of three values; three other values obtained were in excess of 120 seconds for film having an average thickness of 80 microns (μ).

TABLE 10

| Ex. No. | SURFACE ENERGY (dynes/cm) | IMPULSE SEAL RANGE min./max. (volts) | IMPULSE SEAL RANGE at 1 second dwell max. (volts) | SEAL STRENGTH Hot Bar Seal RT/160° F./190° F. (g/cm) | SEAL STRENGTH Impulse Seal at 160° F. (71° C.) at 35 v/40 v/45 v/50 v (g/cm) |
|---|---|---|---|---|---|
| 11 | 31 | ND | ND | 2145/1090/854 | ND |
| 12 | 30 | ND | ND | 2551/1190/929 | ND |
| 13 | 30 | 35/50 | 39 | 1420/869/572* | ND |
| 14 | 37 | 40/>50 | 38 | ND | 584/645/758/754 |
| 15 | 37 | 42/>50 | 40 | ND | 677/803/842/851 |
| 16 | 36 | 42/>50 | 43 | ND | 570/686/788/785 |

ND = NOT DETERMINED
RT = ROOM TEMPERATURE (~20–23° C.)
*The seal tested was a factory seal and the factory sealing method is undetermined.

Referring now to Tables 8, 9, and 10, the films of Examples 11–12 and 14–16 have very good physical properties typically as good or better than those measured for the comparative Example 13. The comparative film had slightly higher shrinkage values, but these values for all films were acceptable for commercial applications. Surprisingly, relative to the comparative commercial film example 13, the inventive films all demonstrate much improved tear strength, and a better appearance including lower haze, higher gloss, and have better resistance to hot water punctures. All films demonstrate suitable oxygen barrier properties. The surface energy measurements indicate values suitable for high meat adhesion for Examples 14–16, and that comparative Example 13 was not corona treated. This comparative example and non-corona treated Examples 11–12 are suitable for use in nonadhering applications such as cook and strip process applications. The films of examples 14–16 all had similar flatwidths of about 240 mm.

The impulse seal ranges of inventive films 14–16 were measured and determined to be desirably broad and sufficient for commercial heat sealing operations. Also, the maximum voltage for impulse seals using a one second dwell time was measured for the films of Examples 14–16. The results indicate that higher irradiation levels raise the maximum burn-through resistance of the inventive film. For comparison, the one second dwell time, maximum impulse seal voltage was measured for the film of comparative Example 6 and a maximum value of 39 volts was obtained.

The seal strengths of hot bar seals made at 500° F. with a 0.5 second dwell time for the inventive films of Examples 11 and 12 are unexpectedly superior to the factory seals of the commercially suitable comparative film of Example 13. Furthermore the seal strengths of the impulse seals of examples 14–16 are surprisingly and unexpectedly superior to those measured for the six layer film of example 6.

Examples 17–23

Five layer tubular films designated here as Examples 17–22 were made by a biaxial stretching orientation process. This process was generally similar to that disclosed above for making the films of Examples 1–3. The layer formulations of the film examples are listed in Table 11.

In examples 17–19 the resins used in layers 2–5 were the same as used in Examples 1–3, except that the second, fourth and fifth layers all included a resin designated in Table 11 as "Plastomer". The plastomer resin used in this set of examples was a copolymer of ethylene and at least one C$_3$–C$_8$ α-olefin having a density less than 0.900 g/cm$^3$ and a melting point less than 85° C. In particular, the plastomer resin used was a commercially available copolymer predominantly of ethylene with a minor proportion of butene-1. This plastomer copolymer has a reported density of about 0.888 g/cm$^3$, a melt index of 0.8 dg/min., and a melting point of 68° C. The plastomer is also believed to have a narrow molecular weight distribution ($\overline{M}_w/\overline{M}x_n$) of about 2 and was available from Exxon Chemical Company of Houston, Tex., U.S.A. under the trademark Exact 9036. Examples 17–19 were similarly made films having the same formulations and structures except that the composition of the first layer was varied.

In Example 17, the first layer (inner surface layer of the tube) was made of 100 wt. % of a propylene terpolymer. This $C_3C_2C_4$ terpolymer was commercially available from Sumitomo Chemical Company, Limited of Tokyo, Japan under the trademark Excellen WS 709N and reportedly had minor proportions of ethylene (1.5%) and butene-1 (14.7%); a melt index of 8 dg/min. (230° C./2.16Kg); and a melting point of about 133°–134° C.

In Example 18, a film similar to that of example 17 was made except the first layer substituted a $C_3C_4$ bipolymer having a reported melt index of 6.5 dg/min.(at 230° C./2.16 Kg); a melting point of about 131° C.; and a butene-1 content of 14% by weight. This copolymer was commercially available from Shell Oil Company, Atlanta, Ga., U.S.A. under the trademark CEFOR SRD4-141.

In Example 19, the first layer of Example 18 was modified to comprise a blend of 70 wt. % of the noted $C_3C_4$ polymer with 30 wt. % of an anhydride-modified LLDPE adhesive having a reported melt index of 2 dg/min; a density of 0.925; a melting point of about 125° C. and was commercially available from Quantum Chemical Company, Cincinnati, Ohio, U.S.A. under the trademark Plexar PX 360.

Examples 17–19 were each irradiated at 4 Mrad and the first layer surface was corona treated. Examples 20 and 21 are comparative examples (not of the invention) which are further described below.

Examples 17–23 demonstrate variation of the first and second layer compositions as well as the effect of addition of an optional plastomer component to the film. The effect on certain properties of irradiation and corona treatment to, respectively, cross-link and surface treat(incorporate polar groups) the film is also evidenced. Also, the examples 17–19 demonstrate use of a core layer which consists essentially of a blend of EVOH and nylon 6/66 copolymer and use of a sealing layer using a preferred low melting point propene copolymer.

In each of the examples 17–19 and 22–23, a core layer of EVOH was used having an ethylene content of 44 mole %; a melt index of 5.5 dg/min.; and a melting point of about 165° C. This EVOH copolymer is commercially available from Eval Company of America of Lisle, Ill., USA under the trademark EVALCA E 105A. In each of the examples 20–21, a core layer of EVOH was used having an ethylene content of 44 mole %; a melt index of 1.6 dg/min.; and a melting point of about 165° C. This EVOH copolymer is commercially available from Eval Company of America of Lisle, Ill., USA under the trademark EVALCA E 151B.

Examples 20 and 21 each used the same $C3C_2$ copolymer in the first layer and the same VLDPE, EVA and processing aid in the fifth layer; and the same adhesive in the second and fourth layers as described for Examples 1–3. The second and fourth layers of Examples 20 and 21 used different EVA resins. The second and fourth layers of example 20 used 60% of an EVA copolymer (EVA A) having a 6.1 wt. % vinyl acetate (VA) content; a density of 0.928 g/cm³; a melt index of 0.3 dg/min; and a melting point of 102° C. in combination with 40% adhesive. This EVA copolymer A is commercially available from EXXON under the trademark ESCORENE LD317.09. The second and fourth layers of Example 21 used 55% of EVA A in combination with 15% of the same LD701 EVA (EVA B) used in the fifth layer; and 30% of adhesive.

As in Examples 1–5, the first(inner) and fifth(outer) layers were connected to opposing sides of a third(core) layer (which comprises EVOH) by second and (intermediate) layers which act in part as adhesive layers.

The EVOH core layer controlled the permeability of the film with regard to gases such as oxygen.

The inventive films of Examples 17–22 each had a five layer structure with the propene copolymer-containing layer being the inner layer of the tubular film. These films have been biaxially stretched to a machine direction (M.D.) orientation (draw) ratio of about 3½:1 and to a radial or transverse direction (T.D.) orientation ratio of about 3:1. The relative layer thicknesses (1st to 5th layers) of the extruded primary and any resultant film of examples 17–19 are believed to be 14.1%/49.7%/9.6%/7.2%/19.4%. The relative layer thicknesses (1st to 5th layers) of the extruded primary and any resultant film of examples 20–23 are believed to be 12.8%/51.3%/6.4%/3%/26.6%.

Examples 20–21 are comparative examples of a five layer structure which was biaxially stretched, as described above for examples 17–19, and had the formulations indicated in Table 11. Example 22 is an example of the invention similar to Example 14, except that it was not irradiated or corona treated. Example 23 is a comparative example (not of the invention) where the formulation was identical to that of Example 22 except that the first layer was modified by substituting 100 wt. % of polypropylene homopolymer (PP)(Escorene® PP 4092 available from Exxon Chemical Co.) for the propene copolymer of Example 22. The PP had a density of about 0.90 g/cm³; and a melt index (condition L) of 2.3 dg/min.

Referring now to a comparison of the examples, it was determined that the inventive film of Example 22 extruded and processed very well forming a stable orientation bubble resulting in a biaxially stretched film of good appearance. The film made in example 22 had an average gauge of 2.11 mil (53.6 μ); a flatwidth of 15⅞ inches (40 cm) and an M.D./T.D. shrinkage value at 90° C. of 30%/39%. Attempts to process the formulation of Example 23 into a biaxially stretched film failed. The polypropylene homopolymer layer appeared to be very hard. Although a primary tube extruded well, attempts at biaxially stretch orienting film from the primary tube resulted in a bubble break as the first layer composition was changed to polypropylene homopolymer. Subsequent attempts to form a stable bubble from primary tubes of the test formulation failed due to bubble rupture during inflation. This demonstrates the unsuitability and undesirability of polypropylene homopolymer as the main or sole constituent of the film layer, especially the first layer.

Various properties of the films of Examples 17–22 were measured and are reported in Tables 12–14 below.

TABLE 11

| | | Layer Composition | | | |
|---|---|---|---|---|---|
| Ex. No. | First Layer (Inner) | Second Layer | Third Layer (Core) | Fourth Layer | Fifth Layer (Outer) |
| 17 | 100% $C_3C_2C_4$ | 37.5% VLDPE<br>17.5% EVA<br>30% Adhesive*<br>15% Plastomer | 90% EVOH<br>10% Nylon | Same as 2nd Layer | 55.6% VLDPE<br>25% EVA<br>4.4% Processing Aid<br>15% Plastomer |

TABLE 11-continued

| | Layer Composition | | | | |
|---|---|---|---|---|---|
| Ex. No. | First Layer (Inner) | Second Layer | Third Layer (Core) | Fourth Layer | Fifth Layer (Outer) |
| 18 | 100% C$_3$C$_4$ | Same as Ex. 17 | Same as Ex. 17 | Same as Ex. 17 | Same as Ex. 17 |
| 19 | 70% C$_3$C$_4$ 30% Adhesive** | Same as Ex. 17 | Same as Ex. 17 | Same as Ex. 17 | Same as Ex. 17 |
| 20 | 100% C$_3$C$_2$ | 60% EVA A 40% Adhesive* | 100% EVOH | Same as 2nd Layer | 70.6% VLDPE 25% EVA 4.4% Processing Aid |
| 21 | Same as Ex. 20 | 55% EVA A 15% EVA B 30% Adhesive* | Same as Ex. 20 | Same as Ex. 20 | Same as Ex. 20 |
| 22 | Same as Ex. 14 | Same as Ex. 14 | Same as Ex. 14 | Same as Ex. 14 | Same as Ex. 14 |
| 23 | 100% PP | Same as Ex. 14 | Same as Ex. 14 | Same as Ex. 14 | Same as Ex. 14 |

*The adhesive is a rubber-modified, anhydride-modified LLDPE adhesive (Plexar PX 380).
**The adhesive is an anhydride-modified LLDPE adhesive (Plexar PX 360).

TABLE 12

| Ex. No. | Avg GAUGE mil (μ) | FLAT WIDTH (mm) | ELONGATION AT BREAK % at RT MD/TD | TENSILE STRENGTH ×10³ psi at RT (mPa) MD/TD | SHRINK at 90 C. % MD/TD | SHRINK at 74 C. % MD/TD | SHRINK FORCE at 90 C. gm/mil (Kg/cm) MD/TD | SHRINK FORCE at RT gm/mil (Kg/cm) MD/TD | SHRINK FORCE at 74 C. gm/mil (Kg/cm) MD/TD | SHRINK FORCE at RT gm/mil (Kg/cm) MD/TD |
|---|---|---|---|---|---|---|---|---|---|---|
| 17 | 2.58 (65.5) | ND | 202/192 | 8.7/7.3 (60/50) | 26/39 | 13/24 | 110/156 (43/61) | 77/134 (30/53) | 85/157 (33/62) | 67/139 (26/55) |
| 18 | 2.95 (74.9) | ND | 139/165 | 7.7/6.9 (53/48) | 33/40 | 16/24 | 133/138 (52/54) | 86/118 (34/46) | 102/150 (40/59) | 83/137 (33/54) |
| 19 | 2.68 (68.1) | ND | 208/213 | 9.1/7.2 (62/49) | 26/36 | 12/22 | 121/148 (47/58) | 84/136 (33/54) | 89/138 (35/54) | 73/129 (29/51) |
| 20 | 2.39 (60.7) | 400 | 127/134 | 7.4/8.0 (51/55) | 21/35 | 9/18 | 103/181 (41/71) | 73/131 (29/52) | 76/158 (30/62) | 67/133 (26/52) |
| 21 | 2.15 (54.6) | 406 | 117/134 | 7.5/7.9 (52/55) | 19/34 | 9/18 | 100/179 (39/70) | 66/128 (26/50) | 78/155 (31/61) | 70/136 (28/54) |

ND = NOT DETERMINED
RT = ROOM TEMPERATURE (~20-23 C.)

TABLE 13

| EX. No. | 1% Secant Modulus MD/TD MPa | TEAR STRENGTH MD/TD g/μ | DYNAMIC PUNCTURE cmKg/μ | HOT H$_2$O PUNCTURE 95 C. μ/seconds | HAZE % | GLOSS AT 45 ANGLE |
|---|---|---|---|---|---|---|
| 17 | 310/504 | 1.1/1.4 | 0.04 | 64.5/24 | 6.4 | 64 |
| 18 | 311/314 | 1.4/1.3 | 0.06 | 75.2/38* | 10.8 | 69 |
| 19 | 316/309 | 0.91/0.94 | 0.04 | 77.0/25 | 19.2 | 49 |
| 20 | 330/345 | 1.1/1.2 | ND | 64.3/28** | 3.4 | 81 |
| 21 | 322/339 | 0.90/0.93 | ND | 61.0/20 | 5.4 | 81 |

ND = NOT DETERMINED
*Reported value is average of 4 samples; Two other samples tested >120 seconds for 86.1μ average thickness films.
**Reported value is average of 5 samples; One other sample tested >120 seconds for a 66.3μ average thickness film.

TABLE 14

| Ex. No. | SURFACE ENERGY (dynes/cm) | IMPULSE SEAL RANGE min./max. (volts) | SEAL STRENGTH Hot Bar Seal RT/160 F.(71 C.)/ 190 F.(88 C.) (g/cm) | Impulse Seal at 160 F. (71 C.) at 35v/40v/45v/50v (g/cm) |
|---|---|---|---|---|
| 17 | 36 | 43/47 | 1470/946/683 | ND |
| 18 | 36 | 43/50 | 2050/983/629 | ND |
| 19 | 36 | 42/49 | ND | ND |
| 20 | ND | ND | 1240/883/760 | 290/252/270/357 |

TABLE 14-continued

| | | IMPULSE | SEAL STRENGTH | |
|---|---|---|---|---|
| Ex. No. | SURFACE ENERGY (dynes/cm) | SEAL RANGE min./max. (volts) | Hot Bar Seal RT/160 F.(71 C.)/ 190 F.(88 C.) (g/cm) | Impulse Seal* at 160 F. (71 C.) at 35v/40v/45v/50v (g/cm) |
| 21 | ND | ND | 1590/770/713 | 309/256/266/304 |

ND = NOT DETERMINED
RT = ROOM TEMPERATURE (~20-23 C.)
*The seal tested was a factory seal and the factory sealing method is undetermined.

Referring now to Tables 11–14, Examples 17–19 all show results of tests which demonstrate that the films produced have useful properties for packaging articles. The examples not only demonstrate that the first layer may utilize bipolymers and terpolymers, but that the core layer may be varied to include a nylon polymer such as nylon 6/66 copolymer. Propene polymers suitable for use in the invention have at least 60 wt. % of propene polymerized with various amounts of one or more α-olefin comonomers. Preferably, the melting point of such propene-based polymers is less than 140° C.

It is seen that addition of adhesive to the first layer of example 19 produced a film with suitable properties but the optical properties and tear strength were not as good as the films of examples 17 and 18. The films of comparative examples 20 and 21 demonstrate inferior impulse seal strength as seen by comparison to earlier samples 4–6 and 14–16 of the invention. This inferior impulse seal strength is believed to be due to the absence in the second and fourth layers of at least 10 wt. % of an ethylene copolymer with at least one $C_4$–$C_8$ α-olefin which has a copolymer density of 0.900 to less than 0.915 g/cm$^3$ a melt index of less than 1.0 dg/min. and a melting point of at least 90° C.

Films, bags and packages of the present invention may also employ combinations of characteristics as described in one or more of the claims including dependent claims which follow this specification and where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

What is claimed is:

1. A multilayer packaging film having at least five layers arranged in sequence and in contact with one another comprising:
   a first layer comprising at least 50% by weight of a copolymer of propene and at least one α-olefin selected from the group consisting of ethylene, butene-1, methylpentene-1, hexene-1, octene-1 and mixtures thereof having a propene content of at least 60 wt. %;
   second and fourth layers each comprising at least 10 wt. % of a first copolymer of ethylene and at least one $C_4$–$C_8$ α-olefin, said copolymer having a density of from 0.900 to 0.915 g/Cm$^3$ and a melt index of less than 1.0 dg/min., and at least 10 wt. % of a second copolymer of ethylene with from 4 to 18 wt. % of a vinyl ester or alkyl acrylate, and, and at least 10 wt. % of an anhydride-modified third copolymer of ethylene with at least one α-olefin, a vinyl ester or an alkyl acrylate, and from 0 to 30 wt. % of a fourth copolymer of ethylene and at least one $C_3C_8$ α-olefin having a density less than 0.900 g/Cm$^3$ and a melting point less of less than 85° C.;
   a third layer comprising at least 80% by weight EVOH copolymer having an ethylene content of at least 38 mole %; and
   a fifth layer comprising at least 30 wt. % of a first copolymer of ethylene with at least one $C_4$–$C_8$ α-olefin, said first copolymer having a density of from 0.900 to 0.915 g/cm$^3$ and a melt index of less than 1.0 dg/min., and at least 10% of a second copolymer of ethylene with from 4 to 18% of a vinyl ester or alkyl acrylate, and from 0 to 30% of a third copolymer of ethylene and at least one $C_3$–$C_8$ α-olefin having a density less than 0.900 g/cm$^3$ and a melting point less of less than 85° C.

2. A film, as defined in claim 1, wherein said propene content of said first layer copolymer is at least 80% based on the weight of said copolymer.

3. A film, as defined in claim 1, wherein said propene content of said first layer copolymer is at least 90% based on the weight of said copolymer.

4. A film, as defined in claim 1, wherein said propene content of said first layer copolymer is at least 95% based on the weight of said copolymer.

5. A film, as defined in claim 1, wherein said first layer comprises propylene-ethylene copolymer.

6. A film, as defined in claim 1, wherein said first layer comprises at least 75% by weight propylene-ethylene copolymer.

7. A film, as defined in claim 1, wherein said first layer comprises propylene-ethylene random copolymer.

8. A film, as defined in claim 1, wherein said first layer comprises propylene-ethylene random copolymer having a melting point less than 140° C.

9. A film, as defined in claim 1, wherein said first layer comprises propylene-ethylene copolymer polymerized from a process using a metallocene catalyst.

10. A film, as defined in claim 1, wherein said first layer consists essentially of propylene-ethylene copolymer.

11. A film, as defined in claim 1, wherein an outer surface of said first layer has a surface energy of at least 29 dynes per cm.

12. A film, as defined in claim 11, wherein said surface energy of said first layer is from 35 to 38 dynes per cm.

13. A film, as defined in claim 1, wherein said first copolymer of said second, fourth and fifth layers comprises an ethylene-α-olefin copolymer having at least 80 wt. % of its polymeric units derived from ethylene.

14. A film, as defined in claim 1, wherein said first copolymer of said second and fourth layers comprises from 10 to 70 wt. % of said layer.

15. A film, as defined in claim 1, wherein said second copolymer of said second layer and said fourth layer each comprises from 10 to 40 wt. % of said respective second and fourth layers.

16. A film, as defined in claim 1, wherein said third copolymer of said second and fourth layers comprises from 10 to 60 wt. % of each of said layers.

17. A film, as defined in claim 1, wherein said fourth copolymer of said second and fourth layers comprises at least 10 wt. % of each of said layers.

18. A film, as defined in claim 1, wherein said second layer of said multilayer film has a thickness that is 25 to 70% of the total thickness of said multilayer film.

19. A film, as defined in claim 1, wherein said second layer of said film further comprises a copolymer of propene and at least one α-olefin selected from the group consisting of ethylene, butene-1, methylpentene-1, hexene-1, octene-1 and mixtures thereof having a propene content of at least 60 wt. %.

20. A film, as defined in claim 1, wherein said third layer of said multilayer film has from 3 to 13% of the total film thickness.

21. A film, as defined in claim 1, wherein said EVOH copolymer has a melting point of about 175° C. or less.

22. A film, as defined in claim 1, wherein said EVOH copolymer has a melting point of about 165° C. or less.

23. A film, as defined in claim 1, wherein said third layer consists essentially of EVOH.

24. A film, as defined in claim 1, wherein said third layer comprises at least 10% by weight nylon 6/66 copolymer.

25. A film, as defined in claim 1, wherein said third copolymer of said fifth layer comprises at least 10 wt. % of said layer.

26. A film, as defined in claim 1, wherein said EVOH has an ethylene content of at least 44 mole percent.

27. A film, as defined in claim 1, wherein said third Layer consists essentially of EVOH and nylon.

28. A film, as defined in claim 1, wherein said third layer further comprises nylon 6/66 copolymer having a melting point of about 195° C.

29. A film, as defined in claim 1, wherein said fourth layer of said multilayer film has a thickness of 1 to 35% of the total film thickness.

30. A film, as defined in claim 1, wherein said fifth layer is an outer surface layer.

31. A film, as defined in claim 1, wherein said first copolymer of said fifth layer comprises at least 40 to 75 wt. %; and said second copolymer comprises at least 10 to 40 wt. % of said layer.

32. A film, as defined in claim 1, wherein said film is heat shrinkable at 90° C.

33. A film, as defined in claim 1, wherein said film has a shrinkage value of at least 20% at 90° C. in both machine and transverse directions.

34. A film, as defined in claim 1, wherein said film has a shrinkage value of at least 30% at 90° C. in at least one direction.

35. A film, as defined in claim 1, wherein said film has a shrinkage value of at least 10% at 74° C. in at least one direction.

36. A film, as defined in claim 1, wherein said film has a shrinkage value of at least 20% at 74° C. in at least one direction.

37. A film, as defined in claim 1, wherein said film is formed as a bag with said first layer being a heat sealable inner surface layer of said bag and said fifth layer being an outer surface layer of said bag.

38. A film, as defined in claim 1, wherein at least one of said layers further comprises polypropylene, propylene ethylene copolymer, ionomer, nylon, polyethylene, ethylene vinyl ester, polyolefin, LLDPE, LMDPE, LDPE, HDPE, elastomer, plastomer, or blends of one or more thereof.

39. A film, as defined in claim 1, wherein said film has an oxygen transmission rate of less than 20 cm³/m² at 24 hours at 1 atmosphere, 0% relative humidity and at about 73° F.(~23° C.).

40. A film, as defined in claim 1, wherein said film is irradiated.

41. A film, as defined in claim 1, wherein said film is irradiated between about 2 to 8 Mrad.

42. A film, as defined in claim 1, wherein said film fifth layer is crosslinked.

43. A film, as defined in claim 1, wherein said film has a haze value of less than 12%.

44. A process for making a biaxially stretched, heat shrinkable, heat sealable, delamination resistant multilayer oxygen barrier film comprising:
(a) coextruding in a tubular form, around a volume of air, melt plastified polymeric resins forming a primary tube having at least five, first through fifth, sequential concentric layers in contact with one another including:
(i) a first layer comprising at least 50% by weight of a copolymer of propene and at least one α-olefin selected from the group consisting of ethylene, butene-1, methylpentene-1, hexene-1, octene-1 and mixtures thereof having a propene content of at least 60 wt. %;
(ii) second and fourth layers comprising at least 10 wt. % of a first copolymer of ethylene and at least one $C_4$–$C_8$ α-olefin, said copolymer having a density of from 0.900 to 0.915 g/cm³ and a melt index of less than 1.0 dg/min., and at least 10 wt. % of a second copolymer of ethylene with from 4 to 18 wt. % of a vinyl ester or alkyl acrylate, and, and at least 10 wt. % of an anhydride-modified third copolymer of ethylene with at least one α-olefin, a vinyl ester or an alkyl acrylate, and from 0 to 30 wt. % of a fourth copolymer of ethylene and at least one $C_3$–$C_8$ α-olefin having a density less than 0.900 g/cm³ and a melting point less of less than 85° C.;
(iii) a third layer comprising at least 80% by weight EVOH copolymer having an ethylene content of at least 38 mole%; and
(iv) a fifth layer comprising at least 30 wt. % of a first copolymer of ethylene with at least one C4–$C_8$ α-olefin, said first copolymer having a density of from 0.900 to 0.915 g/cm³ and a melt index of less than 1.0 dg/min., and at least 10 wt. % of a second copolymer of ethylene with from 4 to 18 wt. % of a vinyl ester or alkyl acrylate, and from 0 to 30 wt. % of a third copolymer of ethylene and at least one $C_3$–$C_8$ α-olefin having a density less than 0.900 g/cm³ and a melting point less of less than 85° C.;
wherein said third layer has <13% of the total thickness of the primary tube, said second layer has 25–70% of the total thickness of the primary tube, and said fourth layer has 1–35% of the total thickness of the primary tube.
(b) cooling and collapsing said primary tube;
(c) reheating said primary tube to an orientation (draw) temperature;
(d) simultaneously biaxially stretching said primary tube forming an expanded, biaxially stretched, secondary tube having a continuous core layer less than 0.13 mil in thickness; and
(e) rapidly cooling said stretched film thereby forming a heat shrinkable film.

45. A process, as defined in claim 44, wherein said heat shrinkable film is irradiated after said cooling step (e) of said stretched film.

46. A process, as defined in claim 44, further comprising heat sealing a portion of said first layer to itself or to an outermost of said film forming a heat seal, wherein said film has an average seal creep at failure time in excess of 60 minutes at 165° F. (74° C.).

47. A multilayer packaging film comprising a heat sealing layer of at least 90% propylene-ethylene random copolymer having a melting point less than 140° C.;
a core layer having a thickness between about 0.05 to about 0.13 mils comprising about 0–20 wt. % of nylon 6/66 copolymer and about 80–100 wt. % of an EVOH copolymer having an ethylene content of at least about 38 mole percent;

an outer protective layer of at least 30 wt. % of a first copolymer of ethylene with between 5 to 20 wt. % of at least one $C_4$–$C_8$ α-olefin, said first copolymer having a density of from 0.900 to 0.915 g/cm$^3$ and a melt index of less than 1.0 dg/min., and at least 10 wt. % of a second copolymer of ethylene with from 4 to 18 wt. % of a vinyl ester or alkyl acrylate, and from 10 to 30 wt. % of a third copolymer of ethylene and at least one $C_3$–$C_8$ α-olefin having a density less than 0.900 g/cm$^3$ and a melting point less of less than 85° C.; and first and second adhesive layers;

wherein said core layer is between said first and second adhesive layers with (1) said first adhesive layer being adhered to a first surface of said core layer, said first adhesive layer being located between said heat sealing layer and said core layer, and (2) said second adhesive layer being adhered to an opposing second surface of said core layer, said second adhesive layer being located between said outer protective layer and said core layer, and said adhesive layers comprising at least 10 wt. % of a first copolymer of ethylene with between 5 to 20 wt. % of at least one $C_4$–$C_8$ α-olefin, said first copolymer having a density of from 0.900 to less than 0.915 g/cm$^3$ and a melt index of less than 1.0 dg/min., and at least 10 wt. % of a second copolymer of ethylene with from 4 to 18 wt. % of a vinyl ester or alkyl acrylate, and at least 10 wt. % of an anhydride-modified third copolymer of ethylene with at least one a- olefin, a vinyl ester or an alkyl acrylate, and from 10 to 30 wt. % of a fourth copolymer of ethylene and between 5 to 25 wt. % of at least one $C_3$–$C_8$ α-olefin having a density less than 0.900 g/cm3 and a melting point less of less than 85° C.; and wherein at least one of said layers is crosslinked.

* * * * *